(12) United States Patent
Denenberg et al.

(10) Patent No.: US 11,919,173 B2
(45) Date of Patent: *Mar. 5, 2024

(54) MOTION PLANNING AND TASK EXECUTION USING POTENTIAL OCCUPANCY ENVELOPES

(71) Applicants: Scott Denenberg, Newton, MA (US); Clara Vu, Cambridge, MA (US); Patrick Sobalvarro, Harvard, MA (US); Alberto Moel, Cambridge, MA (US)

(72) Inventors: Scott Denenberg, Newton, MA (US); Clara Vu, Cambridge, MA (US); Patrick Sobalvarro, Harvard, MA (US); Alberto Moel, Cambridge, MA (US)

(73) Assignee: Veo Robotics, Inc., Waltham, MA (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/400,242

(22) Filed: Aug. 12, 2021

(65) Prior Publication Data

US 2021/0379763 A1 Dec. 9, 2021

Related U.S. Application Data

(63) Continuation-in-part of application No. 16/999,668, filed on Aug. 21, 2020, now abandoned.
(Continued)

(51) Int. Cl.
*B25J 9/16* (2006.01)

(52) U.S. Cl.
CPC .......... *B25J 9/1666* (2013.01); *B25J 9/1651* (2013.01); *B25J 9/1671* (2013.01); *B25J 9/1676* (2013.01)

(58) Field of Classification Search
CPC ...... B25J 9/1666; B25J 9/1651; B25J 9/1671; B25J 9/1676; G05B 2219/49137;
(Continued)

(56) References Cited

U.S. PATENT DOCUMENTS

| 2017/0087722 A1 | 3/2017 | Aberg et al. |
| 2018/0173242 A1* | 6/2018 | Lalonde ............... G05D 1/0274 |

(Continued)

OTHER PUBLICATIONS

International Preliminary Report on Patentability and Written Opinion of corresponding PCT Patent Application No. PCT/US20/47399 dated Feb. 17, 2022 (9 pages).
(Continued)

*Primary Examiner* — Adam R Mott
*Assistant Examiner* — Elizabeth Rose Neleski
(74) *Attorney, Agent, or Firm* — Morgan, Lewis & Bockius LLP

(57) ABSTRACT

Spatial regions potentially occupied by a robot (or other machinery) or portion thereof and a human operator during performance of all or a defined portion of a task or an application are computationally estimated. These "potential occupancy envelopes" (POEs) may be based on the states (e.g., the current and expected positions, velocities, accelerations, geometry and/or kinematics) of the robot and the human operator. Once the POEs of human operators in the workspace are established, they can be used to guide or revise motion planning for task execution.

12 Claims, 26 Drawing Sheets

Related U.S. Application Data

(60) Provisional application No. 63/048,338, filed on Jul. 6, 2020, provisional application No. 62/890,718, filed on Aug. 23, 2019.

(58) Field of Classification Search
CPC .......... G05B 2219/40203; G05B 2219/40478; G05B 2219/49138
See application file for complete search history.

(56) References Cited

U.S. PATENT DOCUMENTS

| | | |
|---|---|---|
| 2018/0222051 A1* | 8/2018 | Vu .......................... B25J 9/1697 |
| 2019/0105779 A1 | 4/2019 | Einav |
| 2019/0217472 A1 | 7/2019 | Nakasu et al. |
| 2019/0262991 A1 | 8/2019 | Sugiyama et al. |
| 2019/0262993 A1 | 8/2019 | Cole et al. |
| 2020/0164516 A1 | 5/2020 | Lehment et al. |

OTHER PUBLICATIONS

International Search Report, Patent Application No. PCT/US2020/047399, dated Jul. 26, 2022, 10 pages.

* cited by examiner

MOTION PLANNING AND TASK EXECUTION USING POTENTIAL OCCUPANCY ENVELOPES

CROSS-REFERENCE TO RELATED APPLICATION

This is a continuation-in-part of U.S. Ser. No. 16/999,668 (filed on Aug. 21, 2020), which claims the benefit of and priority to U.S. Provisional Application No. 62/890,718 (filed on Aug. 23, 2019) and 63/048,338 (filed on Jul. 6, 2020). The entire disclosures of the foregoing priority documents are hereby incorporated by reference.

FIELD OF THE INVENTION

The field of the invention relates, generally, to operation of potentially dangerous machinery and, in particular, to planning safety-constrained robot motion in collaborative human-robot applications.

BACKGROUND

Traditional machinery for manufacturing and other industrial applications has been supplanted by, or supplemented with, new forms of automation that save costs, increase productivity and quality, eliminate dangerous, laborious, or repetitive work, and/or augment human capability. For example, industrial robots possess strength, speed, reliability, and lifetimes that may far exceed human potential. The recent trend toward increased human-robot collaboration in manufacturing workcells imposes particularly stringent requirements on robot performance and capabilities. Conventional industrial robots are dangerous to humans and are usually kept separate from humans through guarding—e.g., robots may be surrounded by a cage with doors that, when opened, cause an electrical circuit to place the machinery in a safe state. Other approaches involve light curtains or two-dimensional (2D) area sensors that slow down or shut off the machinery when humans approach it or cross a prescribed distance threshold. These systems disadvantageously constrain collaborative use of the workspace.

On the other hand, having humans and robots operate in the same workspace places additional demands on robot performance. Both may change position and configuration in rapid and unexpected ways, putting additional performance requirements on the robot's response times, kinematics, and dynamics. Typical industrial robots are fixed, but nonetheless have powerful arms that can cause injury over a wide "envelope" of possible movement trajectories; having knowledge of these trajectories in spaces where humans are present is thus fundamental to safe operation.

In general, robot arms comprise a number of mechanical links connected by revolute and prismatic joints that can be precisely controlled, and a controller coordinates all of the joints to achieve trajectories that are determined and programmed by an automation or manufacturing engineer for a specific application. Systems that can accurately control the robot trajectory are essential for safety in collaborative human-robot applications. However, the accuracy of industrial robots is limited by factors such as manufacturing tolerances (e.g., relating to fabrication of the mechanical arm), joint friction, drive nonlinearities, and tracking errors of the control system. In addition, backlash or compliances in the drives and joints of these robot manipulators can limit the positioning accuracy and the dynamic performance of the robot arm.

Kinematic definitions of industrial robots, which describe the total reachable volume (or "joint space") of the manipulator, are derived from the individual robot link geometry and their assembly. A dynamic model of the robot is generated by taking the kinematic definition as an input, adding to it information about the speeds, accelerations, forces, range-of-motion limits, and moments that the robot is capable of at each joint interface, and applying a system identification procedure to estimate the robot dynamic model parameters. Accurate dynamic robot models are needed in many areas, such as mechanical design, workcell and performance simulation, control, diagnosis, safety and risk assessment, and supervision. For example, dexterous manipulation tasks and interaction with the environment, including humans in the vicinity of the robot, may demand accurate knowledge of the dynamic model of the robot for a specific application. Once estimated, robot model parameters can be used to compute stopping distances and other safety-related quantities. Because robot links are typically large, heavy metal castings fitted with motors, they have significant inertia while moving. Depending on the initial speed, payload, and robot orientation, a robot can take a significant time (and travel a great distance, many meters is not unusual) to stop after a stop command has been issued.

Dynamic models of robot arms are represented in terms of various inertial and friction parameters that are either measured directly or determined experimentally. While the model structure of robot manipulators is well known, the parameter values needed for system identification are not always available, since dynamic parameters are rarely provided by the robot manufacturers and often are not directly measurable. Determination of these parameters from computer-aided design (CAD) data or models may not yield a complete representation because they may not include dynamic effects like joint friction, joint and drive elasticities, and masses introduced by additional equipment such as end effectors, workpieces, or the robot dress package.

One important need for effective robotic system identification is in the estimation of joint acceleration characteristics and robot stopping distances for the safety rating of robotic equipment. As humans physically approach robotic arms, a safety system can engage and cut or reduce power to the arm, but robot inertia can keep the robot arm moving. The effective stopping distance (measured from the engagement of the safety system, such as a stopping command) is an important input for determining the safe or "protective" separation distance (PSD) from the robot arm given inertial effects. Similarly, all sensor systems include some amount of latency, and joint acceleration characteristics determine how the robot's state can change between measurement and application of control signal. Robot manufacturers usually provide curves or graphs showing stopping distances and times, but these curves can be difficult to interpret, may be sparse and of low resolution, tend to reflect specific loads, and typically do not include acceleration or indicate the robot position at the time of engaging the stop. An improved approach to modeling and predicting robot dynamics under constraints and differing environmental conditions (such as varying payloads and end effectors) is set forth in U.S. Patent Publication No. 2020/0070347, the entire disclosure of which is hereby incorporated by reference.

Even with robot behavior fully modeled, however, safe operation for a given application—particularly if that application involves interaction with or proximity to humans depends on the spatial arrangement of the workspace, the relative positions of the robot and people or vulnerable objects, the task being performed, and robot stopping capabilities. For example, if robot movements are simple and consistently repeated over short periods, nearby human operators can observe and quickly learn them, and safely and easily plan and execute their own actions without violating the PSD. However, if robot movements are more complex or aperiodic, or if they happen over longer periods or broader areas, then nearby humans can err in predicting robot movement and move in a way that can violate the PSD.

At the same time, the robot movements involved in performing a task are typically planned based on robot kinematics, fixed obstacles and efficiency rather than the actual presence of human operators and safety constraints. In effect, humans plan activities around the robot rather than vice versa, limiting the ability to collaborate.

Accordingly, there is a need for approaches that facilitate spatial modeling by incorporating the human-robot collaboration and, if desired, visualization of calculated safe or unsafe regions in the vicinity of a robot and/or a human operator based on, and influencing, the task performed by the robot and/or the human operator. This approach should apply more generally to any type of industrial machinery that operates in proximity to and/or collaboration with human workers.

SUMMARY

The present invention is directed to approaches for modeling the dynamics of machinery and/or human activities in a workspace for safety by taking into account collaborative workflows and processes, and planning robot execution of tasks around the presence and predicted movements of humans in proximity. Although the ensuing discussion focuses on industrial robots, it should be understood that the present invention and the approaches described herein are applicable to any type of controlled industrial machinery whose operation occurs in the vicinity of, and can pose a danger to, human workers.

In various embodiments, the spatial regions potentially occupied by any portion of the robot (or other machinery) and the human operator within a defined time interval or during performance of all or a defined portion of a task or an application are generated, e.g., calculated dynamically and, if desired, represented visually. These "potential occupancy envelopes" (POEs) may be based on the states (e.g., the current and expected positions, velocities, accelerations, geometry and/or kinematics) of the robot and the human operator (e.g., in accordance with the ISO 13855 standard, "Positioning of safeguards with respect to the approach speeds of parts of the human body"). POEs may be computed based on a simulation of the robot's performance of a task, with the simulated trajectories of moving robot parts (including workpieces) establishing the three-dimensional (3D) contours of the POE in space. Alternatively, POEs may be obtained based on observation (e.g., using 3D sensors) of the robot as it performs the task, with the observed trajectories used to establish the POE contours.

In some embodiments, a "keep-in" zone and/or a "keep-out" zone associated with the robot can be defined, e.g., based on the POEs of the robot and human operator. In the former case, operation of the robot is constrained so that all portions of the robot and workpieces remain within the spatial region defined by the keep-in zone. In the latter case, operation of the robot is constrained so that no portions of the robot and workpieces penetrate the keep-out zone. Based on the POEs of the robot and human operator and/or the keep-in/keep-out zones, movement of the robot during physical performance of the activity may be restricted in order to ensure safety.

In addition, the workspace parameters, such as the dimensions thereof, the workflow, the locations of the resources (e.g., the workpieces or supporting equipment), etc. can be modeled based on the computed POEs, thereby achieving high productivity and spatial efficiency while ensuring safety of the human operator. In one embodiment, the POEs of the robot and the human operator are both presented on a local display (a screen, a VR/AR headset, etc., e.g., as described in U.S. Patent Publ. No. 2020/0331155, filed on Jul. 2, 2020, the entire disclosure of which is hereby incorporated by reference) and/or communicated to a smartphone or tablet application for display thereon; this allows the human operator to visualize the space that is currently occupied or will be potentially occupied by the robot or the human operator, thereby enabling the operator to plan motions efficiently around the POE and further ensuring safety.

Once the POEs of human operators in the workspace are established, they can be used to guide or revise motion planning for task execution. In particular, a constrained motion plan for the machinery specifying a trajectory and/or a state (e.g., an orientation, a pose, a velocity, etc.) of the machinery from the commencement to the end of a task can be computationally created and modified as conditions change. The term "trajectory" and "trajectories," when applied to task performance, are interchangeably used to connote the sequence of movements executed by the machinery to perform the task.

Based on the constrained motion plan, the machinery may perform the task without entering the POEs—i.e., the machinery and its appendages are constrained to operate within safe regions. In one implementation, the motion plan includes multiple trajectories; each trajectory may be assigned a cost value based on, for example, the length of the trajectory and/or an operation time of the machinery on the trajectory. The trajectory corresponding to the minimal cost value (e.g., the shortest length and/or shortest operation time) and satisfying the safety constraint may be selected, and the machinery can then perform the task in accordance with the selected trajectory. This approach maximizes efficient operation of the machinery within the constraints of safety.

Alternatively or in addition, the motion plan may be established conventionally and the machinery controlled, during performance of a task, to maintain the PSD, i.e., the minimum distance separating the robot from the operator and/or other safety-related entities. The PSD may be continuously or quasi-continuously updated based on the scanning data of the robot and/or human operator acquired during execution of the task. In one embodiment, information about the computed PSD is combined with the POE of the human operator; based thereon, an optimal path of the robot in the workspace can then be determined. By "continuously" is meant obtaining samples at least 24 times/second. By "quasi-continuously" is meant at intervals no greater than the worst-case time required to bring the machinery to a safe state or the stopping time of the machinery in a direction toward the POE of the human operator. Often this means obtaining samples at least 10 times/second (i.e. a stopping time of 100 ms). The interval may be based at least in part on a current state specifying a position, velocity and acceleration of the machinery, and/or may be based on programmed movements of the machinery in performing the activity beginning at the current time based on the motion plan.

In various embodiments, one or more two-dimensional (2D) and/or three-dimensional (3D) imaging sensors are employed to scan the robot, human operator and/or workspace during actual execution of the task. Based thereon, the POEs of the robot and the human operator can be updated in real-time and provided as feedback to adjust the state (e.g., position, orientation, velocity, acceleration, etc.) of the robot and/or the modeled workspace. In some embodiments, the scanning data is stored in memory and can be used as an input when modeling the workspace in the same human-robot collaborative application next time. In some embodiments, robot state can be communicated from the robot controller, and subsequently validated by the 2D and/or 3D imaging sensors. In other embodiments, the scanning data may be exported from the system in a variety of formats for use in other CAD software. In still other embodiments, the POE is generated by simulating performance (rather than scanning actual performance) of a task by a robot or other machinery.

Accordingly, in a first aspect, the invention pertains to a safety system for enforcing safe operation of machinery performing an activity in a 3D workspace. In various embodiments, the system comprises a computer memory for storing a model of the machinery and its permitted movements and a task specification; and a processor configured to computationally generate a 3D spatial representation of the workspace; identify a 3D region of the workspace corresponding to space occupied or potentially occupied by a human within the workspace augmented by a 3D envelope around the human corresponding to anticipated movements of the human within the workspace during performance of the specified task; computationally generate a constrained motion plan comprising a trajectory of the machinery to perform the task without entering the 3D region; and cause the machinery to execute the constrained motion plan and physically perform the specified task.

In another aspect, the invention relates to a safety system for enforcing safe operation of machinery performing an activity in a workspace, and comprises, in various embodiments, a computer memory for storing a model of the machinery and its permitted movements and a task specification; and a processor configured to computationally generate a 3D spatial representation of the workspace; identify and quasi-continuously update a computational representation of a 3D region of the workspace corresponding to (i) space occupied or potentially occupied by a human within the workspace augmented by a 3D envelope around the human corresponding to anticipated movements of the human within the workspace during performance of the specified task and (ii) a protective separation distance; computationally generate a motion plan comprising a trajectory of the machinery to perform the task; and cause the machinery to execute the constrained motion plan and perform the specified task without entering the 3D region and violating the protective separation distance.

In some embodiments, the constrained motion plan implements a safety protocol specifying speed restrictions of the machinery in proximity to a human and a minimum separation distance between the machinery and a human. The motion plan may comprise a plurality of trajectories of the machinery, and a cost value may be assigned to each of the trajectories. One of the trajectories may be selected based at least in part on the cost values assigned to the trajectories, and the machinery caused to execute the selected trajectory to perform the task.

In various embodiments, the corresponding cost value is assigned to each of the trajectories based at least in part on a length of the trajectory and/or an operation time of the machinery on the trajectory. The processor may be responsive to real-time monitoring of the workspace and may be further configured to alter the motion plan in response to a change in the 3D region. For example, the processor may recompute the motion plan in response to a change in the 3D region, e.g., by generating a plurality of candidate trajectories each capable of performing the task and selecting one of the candidate trajectories.

In some embodiments, the computer memory further stores a geometric representation of a restriction zone within the 3D spatial representation of the workspace and the processor is configured to, during physical performance of the specified task, restrict operation of the machinery to remain within or outside the restriction zone. The restriction zone may be a keep-out zone, in which case the constrained motion plan comprises trajectories along which the machinery can perform the specified task without entering the keep-out zone. Alternatively, the restriction zone may be a keep-in zone, in which case the constrained motion plan comprises trajectories along which the machinery can perform the specified task without leaving the keep-out zone.

The processor may be configured to, during physical performance of the task, continuously compare an instantaneous measured distance between the machinery and the human to the protective separation distance and adjust an operating speed of the machinery based at least in part on the comparison. Alternatively or in addition, the processor may be configured to, during physical performance of the task, govern an operating speed of the machinery to a set point at a distance larger than the protective separation distance.

The processor may be responsive to real-time monitoring of the workspace and may be further configured to alter the motion plan in response to a change in the 3D region. For example, the processor may recompute the motion plan in response to a change in the 3D region, e.g., by generating a plurality of candidate trajectories each capable of performing the task and selecting one of the candidate trajectories.

In still another aspect, the invention relates to a method of enforcing safe operation of machinery performing an activity in a 3D workspace. In various embodiments, the method comprises the steps of computationally generating a 3D spatial representation of the workspace; computationally identifying a 3D region of the workspace corresponding to space occupied or potentially occupied by a human within the workspace augmented by a 3D envelope around the human corresponding to anticipated movements of the human within the workspace during performance of the specified task; computationally generating a constrained motion plan comprising a trajectory of the machinery to perform the task without entering the 3D region; and causing the machinery to execute the constrained motion plan and physically perform the specified task.

Yet another aspect of the invention pertains to a method of enforcing safe operation of machinery performing an activity in a 3D workspace, comprising, in various embodiments, the steps of computationally generating a 3D spatial representation of the workspace; identifying and quasi-continuously updating a computational representation of a 3D region of the workspace corresponding to (i) space occupied or potentially occupied by a human within the workspace augmented by a 3D envelope around the human corresponding to anticipated movements of the human within the workspace during performance of the specified task and (ii) a protective separation distance; computationally generating a motion plan comprising a trajectory of the machinery to perform the task; and causing the machinery to execute the constrained motion plan and perform the specified task without entering the 3D region and/or violating the protective separation distance.

In various embodiments, the constrained motion plan implements a safety protocol specifying speed restrictions of the machinery in proximity to a human and a minimum separation distance between the machinery and a human. The motion plan may include a plurality of trajectories of the machinery, and the method may further comprise the steps of assigning a cost value to each of the trajectories; computationally selecting one of the trajectories based at least in part on the cost values assigned to the trajectories; and causing the machinery to execute the selected trajectory to perform the task.

The method may further comprise the step of assigning the corresponding cost value to each of the trajectories based at least in part on a length of the trajectory and/or an operation time of the machinery on the trajectory. The motion plan may be altered in response to a change in the 3D region. In various embodiments, the method includes storing a geometric representation of a restriction zone within the 3D spatial representation of the workspace and, during physical performance of the specified task, restricting operation of the machinery to remain within or outside the restriction zone. The restriction zone may be a keep-out zone, in which case the constrained motion plan comprises trajectories along which the machinery can perform the specified task without entering the keep-out zone. Alternatively, the restriction zone may be a keep-in zone, in which case the constrained motion plan comprises trajectories along which the machinery can perform the specified task without leaving the keep-out zone.

In various embodiments, the method further includes, during physical performance of the task, continuously comparing an instantaneous measured distance between the machinery and the human to the protective separation distance and adjusting an operating speed of the machinery based at least in part on the comparison. Alternatively or in addition, the method may include governing an operating speed of the machinery to a set point at a distance larger than the protective separation distance. The method may further comprise the step of altering the motion plan in response to a change in the 3D region. For example, the motion plan may be recomputed, e.g., by generating a plurality of candidate trajectories each capable of performing the task and selecting one of the candidate trajectories.

The 3D region of the workspace may correspond to space occupied or potentially occupied by the human within the workspace augmented by a 3D envelope around the human corresponding to anticipated movements of the human within the workspace during an interval. The interval may correspond to the time required to bring the machinery to a safe state and/or may be based at least in part on the worst-case stopping time of the machinery in a direction toward the 3D envelope around the human.

In some embodiments, the method further comprises the step of providing a plurality of sensors distributed about the workspace, where each of the sensors is configured to record images of a portion of the workspace within a sensor field of view. The workspace portions collectively cover the entire workspace and wherein the 3D region of the workspace is computed based on images generated by the sensors during performance of the task by the machinery.

In general, as used herein, the term "robot" means any type of controllable industrial equipment for performing automated operations—such as moving, manipulating, picking and placing, processing, joining, cutting, welding, etc.—on workpieces. The term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

The following discussion describes an integrated system and methods for fully modeling and/or computing in real time the robot dynamics and/or human activities in a workspace for safety. In some cases, this involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

Figure 1:
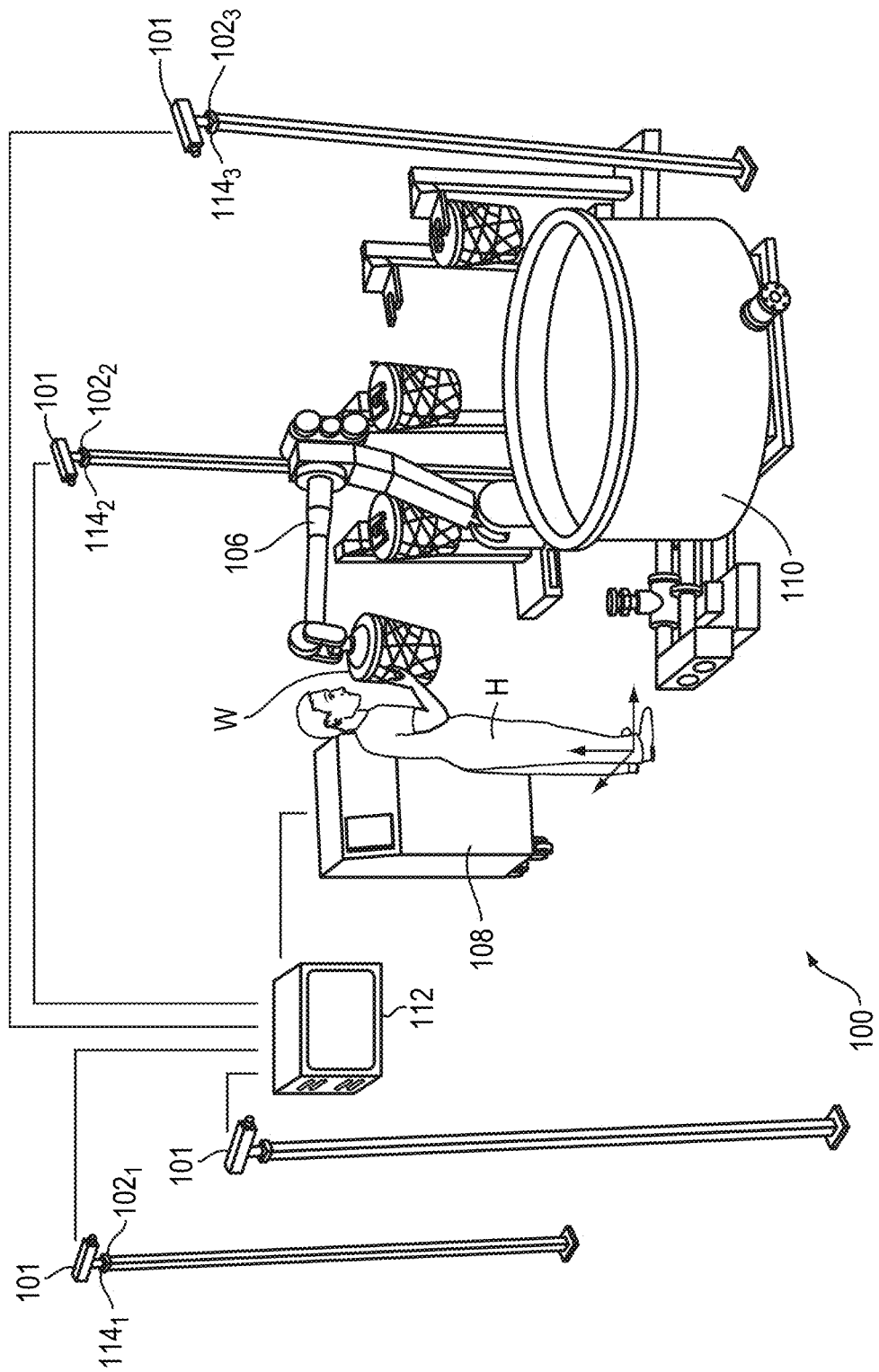
FIG. 1 is a perspective view of a human-robot collaborative workspace in accordance with various embodiments of the present invention.

Refer first to FIG. 1, which illustrates a representative human-robot collaborative workspace 100 equipped with a safety system including a sensor system 101 having one or more sensors representatively indicated at $102_1$, $102_2$, $102_3$ for monitoring the workspace 100. Each sensor may be associated with a grid of pixels for recording data (such as images having depth, range or any 3D information) of a portion of the workspace within the sensor field of view. The sensors $102_{1-3}$ may be conventional optical sensors such as cameras, e.g., 3D time-of-flight (ToF) cameras, stereo vision cameras, or 3D LIDAR sensors or radar-based sensors, ideally with high frame rates (e.g., between 25 frames per second (FPS) and 100 FPS). The mode of operation of the sensors $102_{1-3}$ is not critical so long as a 3D representation of the workspace 100 is obtainable from images or other data obtained by the sensors $102_{1-3}$. The sensors $102_{1-3}$ may collectively cover and can monitor the entire workspace (or at least a portion thereof) 100, which includes a robot 106 controlled by a conventional robot controller 108. The robot 106 interacts with various workpieces W, and a human operator H in the workspace 100 may interact with the workpieces W and/or the robot 106 to perform a task. The workspace 100 may also contain various items of auxiliary equipment 110. As used herein the robot 106 and auxiliary equipment 110 are denoted as machinery in the workspace 100.

In various embodiments, data obtained by each of the sensors $102_{1-3}$ is transmitted to a control system 112. Based thereon, the control system 112 may computationally generate a 3D spatial representation (e.g., voxels) of the workspace 100, recognize the robot 106, human operator and/or workpiece handled by the robot and/or human operator, and track movements thereof as further described below. In addition, the sensors $102_{1-3}$ may be supported by various software and/or hardware components $114_{1-3}$ for changing the configurations (e.g., orientations and/or positions) of the sensors $102_{1-3}$; the control system 112 may be configured to adjust the sensors so as to provide optimal coverage of the monitored area in the workspace 100. The volume of space covered by each sensor—typically a solid truncated pyramid or solid frustum may be represented in any suitable fashion, e.g., the space may be divided into a 3D grid of small (5 cm, for example) voxels or other suitable form of volumetric representation. For example, a 3D representation of the workspace 100 may be generated using 2D or 3D ray tracing. This ray tracing can be performed dynamically or via the use of precomputed volumes, where objects in the workspace 100 are previously identified and captured by the control system 112. For convenience of presentation, the ensuing discussion assumes a voxel representation, and the control system 112 maintains an internal representation of the workspace 100 at the voxel level.

Figure 2:
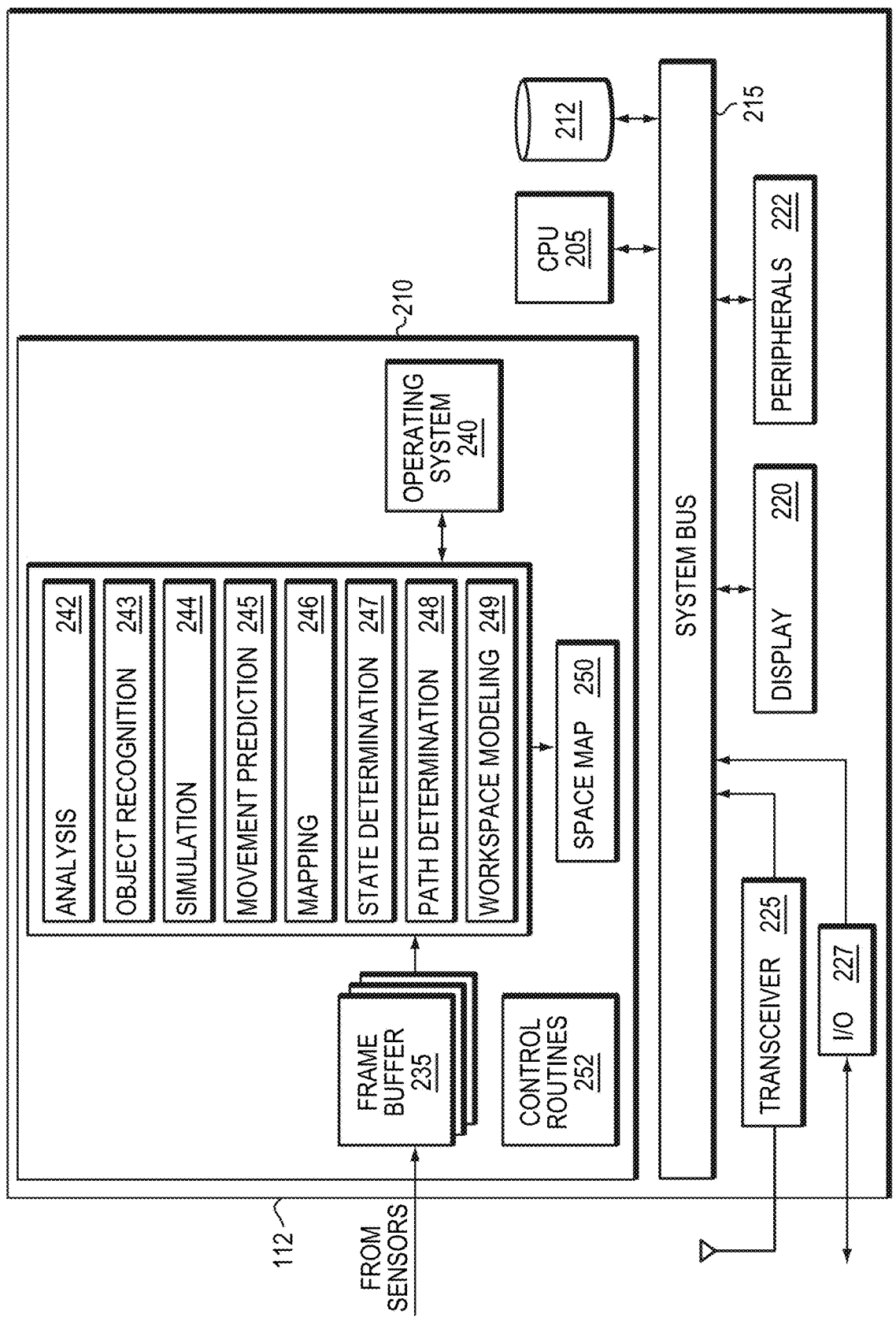
FIG. 2 schematically illustrates a control system in accordance with various embodiments of the present invention.

FIG. 2 illustrates, in greater detail, a representative embodiment of the control system 112, which may be implemented on a general-purpose computer. The control system 112 includes a central processing unit (CPU) 205, system memory 210, and one or more non-volatile mass storage devices (such as one or more hard disks and/or optical storage units) 212. The control system 112 further includes a bidirectional system bus 215 over which the CPU 205, functional modules in the memory 210, and storage device 212 communicate with each other as well as with internal or external input/output (I/O) devices, such as a display 220 and peripherals 222 (which may include traditional input devices such as a keyboard or a mouse). The control system 112 also includes a wireless transceiver 225 and one or more I/O ports 227. The transceiver 225 and I/O ports 227 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with the control system 112 using a tablet that wirelessly joins the network. When used in a WAN networking environment, computers typically include a modem or other communication mechanism. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

The CPU 205 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 210 may store a model of the machinery characterizing its geometry and kinematics and its permitted movements in the workspace. The model may be obtained from the machinery manufacturer or, alternatively, generated by the control system 112 based on the scanning data acquired by the sensor system 101. In addition, the memory 210 may store a safety protocol specifying various safety measures such as speed restrictions of the machinery in proximity to the human operator, a minimum separation distance between the machinery and the human, etc. In some embodiments, the memory 210 contains a series of frame buffers 235, i.e., partitions that store, in digital form (e.g., as pixels or voxels, or as depth maps), images obtained by the sensors $102_{1-3}$; the data may actually arrive via I/O ports 227 and/or transceiver 225 as discussed above.

The system memory 210 contains instructions, conceptually illustrated as a group of modules, that control the operation of CPU 205 and its interaction with the other hardware components. An operating system 240 (e.g., Windows or Linux) directs the execution of low-level, basic system functions such as memory allocation, file management and operation of the mass storage device 212. At a higher level, and as described in greater detail below, an analysis module 242 may register the images acquired by the sensor system 101 in the frame buffers 235, generate a 3D spatial representation (e.g., voxels) of the workspace and analyze the images to classify regions of the monitored workspace 100; an object-recognition module 243 may recognize the human and the machinery and movements thereof in the workspace based on the data acquired by the sensor system 101; a simulation module 244 may computationally perform at least a portion of the application/task performed by the machinery in accordance with the stored machinery model and application/task; a movement prediction module 245 may predict movements of the machinery and/or the human operator within a defined future interval (e.g., 0.1 sec, 0.5 sec, 1 sec, etc.) based on, for example, the current state (e.g., position, orientation, velocity, acceleration, etc.) thereof; a mapping module 246 may map or identify the POEs of the machinery and/or the human operator within the workspace; a state determination module 247 may determine an updated state of the machinery such that the machinery can be operated in a safe state; a path determination (or "motion planning") module 248 may determine a path along which the machinery can perform the activity; and a workspace modeling module 249 may model the workspace parameter (e.g., the dimensions, workflow, locations of the equipment and/or resources). The result of the classification, object recognition and simulation as well as the POEs of the machinery and/or human, the determined optimal path and workspace parameters may be stored in a space map 250, which contains a volumetric representation of the workspace 100 with each voxel (or other unit of representation) labeled, within the space map, as described herein. Alternatively, the space map 250 may simply be a 3D array of voxels, with voxel labels being stored in a separate database (in memory 210 or in mass storage 212).

In various embodiments, a the motion-planning module 248 receives (i) a task specification from system memory 210, mass storage 212, or directly from the user via I/O 227 and (ii) data related to the classified regions of the monitored workspace from the analysis module 242 and/or space map 250, and, based thereon, generates a constrained motion plan according to which the robot 106 performs the specified task without entering unsafe regions—e.g., POEs associated with human operators as described in greater detail below. The motion plan may be stored in system memory 210 or in mass storage 212. In one embodiment, the motion plan includes more than one trajectory of the machinery for performing the task—i.e., all of the included trajectories can perform the task within the safety constraint(s) but involve different movement sequences. The motion-planning module 248 may select an optimal trajectory among those identified in the motion plan. For example, the motion-planning module 248 may assign a cost value to each candidate trajectory based on, for example, the length of the trajectory and/or the operating time required for the machinery to execute the trajectory. The motion-planning module 248 may then select the optimal trajectory based on the cost value (e.g., the minimum cost corresponding to the shortest trajectory length and/or shortest operating time), thereby ensuring efficient and safe operation of the machinery.

Robot motion planning involves finding a path through free space from some start configuration to any configuration within a set of goal configurations; a sequence of such paths is defined to perform a task. A common approach to solving motion-planning problems is to create a probabilistic roadmap (PRM), e.g., a graph where each node is a point in a defined space and a pair of points is connected if a direct movement between them is possible without a collision. Other well-known approaches to robot motion planning include the rapidly exploring random trees (RRT) algorithm and similar algorithms that can accommodate both kinematic and dynamic constraints. Any such algorithms may be used in accordance herewith to produce candidate trajectories.

In addition, the control system 112 may communicate with the robot controller 108 to control operation of the machinery in the workspace 100 (e.g., performing a task/application programmed in the controller 108 or the control system 112) using conventional control routines collectively indicated at 252. As explained below, the configuration of the workspace may well change over time as persons and/or machines move about; the control routines 252 may be responsive to these changes in operating machinery to achieve high levels of safety. For example, even though a safety-maximizing motion plan has been selected, the modules in system memory 210 may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, Caffe or Theano. Additionally, the software can be implemented in an assembly language and/or machine language directed to the microprocessor resident on a target device.

When a task/application involves human-robot collaboration, it may be desired to model and/or compute, in real time, the robot dynamics and/or human activities and provide safety mapping of the robot and/or human in the workspace 100. This is true whether or not the robot movements executed in performing a task have been defined with safety constraints in mind, as described above, since workspace configurations can change continuously. In particular, mapping a safe and/or unsafe region in human-robot collaborative applications is a complicated process because, for example, the robot state (e.g., current position, velocity, acceleration, payload, etc.) that represents the basis for extrapolating to all possibilities of the robot speed, load, and extension is subject to abrupt change. These possibilities typically depend on the robot kinematics and dynamics (including singularities and handling of redundant axes, e.g., elbow-up or elbow-down configurations) as well as the dynamics of the end effector and workpiece. Moreover, the safe region may be defined in terms of a degree rather than simply as "safe." The process of modeling the robot dynamics and mapping the safe region, however, may be simplified by assuming that the robot's current position is fixed and estimating the region that any portion of the robot may conceivably occupy within a short future time interval only. Thus, various embodiments of the present invention include approaches to modeling the robot dynamics and/or human activities in the workspace 100 and mapping the human-robot collaborative workspace 100 (e.g., calculating the safe and/or unsafe regions) over short intervals based on the current states (e.g., current positions, velocities, accelerations, geometries, kinematics, expected positions and/or orientations associated with the next action in the task/application) associated with the machinery (including the robot 106 and/or other industrial equipment) and the human operator. In addition, the modeling and mapping procedure may be repeated (based on, for example, the scanning data of the machinery and the human acquired by the sensor system 101 during performance of the task/application) over time, thereby effectively updating the safe and/or unsafe regions on a quasi-continuous basis in real time.

To model the robot dynamics and/or human activities in the workspace 100 and map the safe and/or unsafe regions, in various embodiments, the control system 112 first computationally generates a 3D spatial representation (e.g., as voxels) of the workspace 100 where the machinery (including the robot 106 and auxiliary equipment), workpiece and human operator are based on, for example, the scanning data acquired by the sensor system 101. In addition, the control system 112 may access the memory 210 or mass storage 212 to retrieve a model of the machinery characterizing the geometry and kinematics of the machinery and its permitted movements in the workspace. The model may be obtained from the robot manufacturer or, alternatively, generated by the control system 112 based on the scanning data acquired by the sensor system prior to mapping the safe and/or unsafe regions in the workspace 100. Based on the machinery model and the currently known information about the machinery, a spatial POE of the machinery can be estimated. As a spatial map, the POE may be represented in any computationally convenient form, e.g., as a cloud of points, a grid of voxels, a vectorized representation, or other format. For convenience, the ensuing discussion will assume a voxel representation.

Figure 3A:
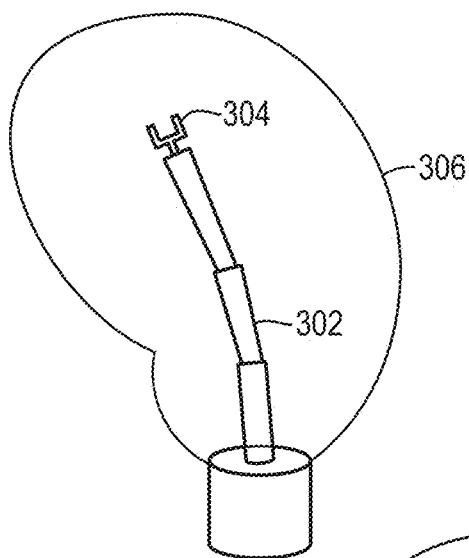
FIGS. 3A-3C depict exemplary POEs of machinery (in particular, a robot arm) in accordance with various embodiments of the present invention.
Figure 3B:
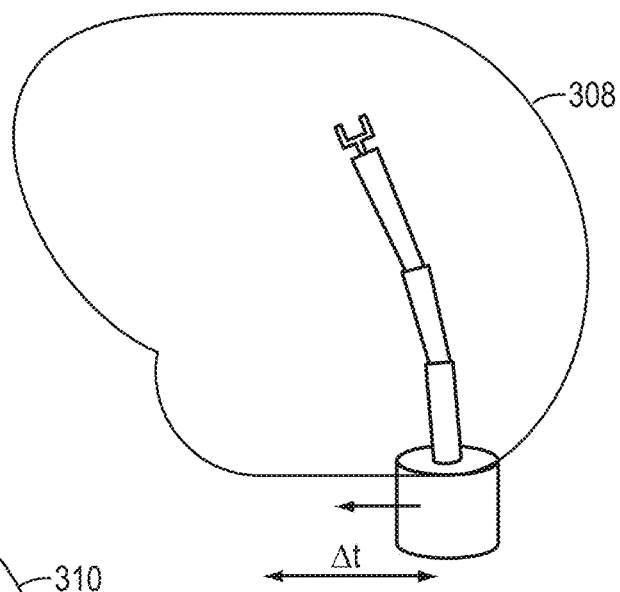

FIG. 3A illustrates a scenario in which only the current position of a robot 302 and the current state of an end-effector 304 are known. To estimate the spatial POE 306 of the robot 302 and the end-effector 304 within a predetermined time interval, it may be necessary to consider a range of possible starting velocities for all joints of the robot 302 (since the robot joint velocities are unknown) and allow the joint velocities to evolve within the predetermined time interval according to accelerations/decelerations consistent with the robot kinematics and dynamics. The entire spatial region 306 that the robot and end-effector may potentially occupy within the predetermined time interval is herein referred to as a static, "robot-level" POE. Thus, the robot-level POE may encompass all points that a stationary robot may possibly reach based on its geometry and kinematics, or if the robot is mobile, may extend in space to encompass the entire region reachable by the robot within the predefined time. For example, referring to FIG. 3B, if the robot is constrained to move along a linear track, the robot-level POE 308 would correspond to a linearly stretched version of the stationary robot POE 306, with the width of the stretch dictated by the chosen time window Δt.

In one embodiment, the POE 306 represents a 3D region which the robot and end-effector may occupy before being brought to a safe state. Thus, in this embodiment, the time interval for computing the POE 306 is based on the time required to bring the robot to the safe state. For example, referring again to FIG. 3A, the POE 306 may be based on the worst-case stopping times and distances (e.g., the longest stopping times with the furthest distances) in all possible directions. Alternatively, the POE 306 may be based on the worst-case stopping time of the robot in a direction toward the human operator. In some embodiments, the POE 306 is established at an application or task level, spanning all voxels potentially reached by the robot during performance of a particular task/application as further described below.

In addition, the POE 306 may be refined based on safety features of the robot 106; for example, the safety features may include a safety system that initiates a protective stop even when the velocity or acceleration of the robot is not known. Knowing that a protective stop has been initiated and its protective stop input is being held may effectively truncate the POE 306 of the robot (since the robot will only decelerate until a complete stop is reached). In one embodiment, the POE 306 is continuously updated at fixed time intervals (thereby changing the spatial extent thereof in a stepwise manner) during deceleration of the robot; thus, if the time intervals are sufficiently short, the POE 306 is effectively updated on a quasi-continuous basis in real time.

Figure 3C:
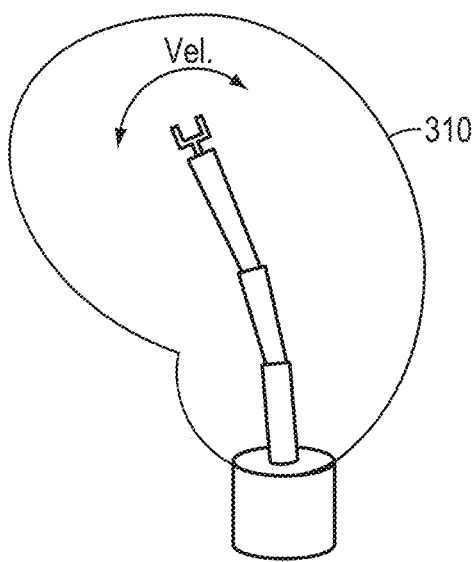

FIG. 3C depicts another scenario where the robot's state—e.g., the position, velocity and acceleration—are known. In this case, based on the known movement in a particular direction with a particular speed, a more refined (and smaller) time-bounded POE 310 may be computed based on the assumption that the protective stop may be initiated. In one embodiment, the reduced-size POE 310 corresponding to a short time interval is determined based on the instantaneously calculated deceleration from the current, known velocity to a complete stop and then acceleration to a velocity in the opposite direction within the short time interval.

In various embodiments, the POE of the machinery is more narrowly defined to correspond to the execution of a task or an application, i.e., all points that the robot may or can reach during performance of the task/application. This "task-level" or "application-level" POE may be estimated based on known robot operating parameters and the task/ application program executed by the robot controller. For example, the control system 112 may access the memory 210 and/or storage 212 to retrieve the model of the machinery and the task/application program that the machinery will execute. Based thereon, the control system 112 may simulate operation of the machinery in a virtual volume (e.g., defined as a spatial region of voxels) in the workspace 100 for performing the task/application. The simulated machinery may sweep out a path in the virtual volume as the simulation progresses; the voxels that represent the spatial volume encountered by the machinery for performing the entire task/application correspond to a static task-level or application-level POE. In addition, because the machinery dynamically changes its trajectory (e.g., the pose, velocity and acceleration) during execution of the task/application, a dynamic POE may be defined as the spatial region that the machinery, as it performs the task/application, may reach from its current position within a predefined time interval. The dynamic POE may be determined based on the current state (e.g., the current position, current velocity and current acceleration) of the machinery and the programmed movements of the machinery in performing the task/application beginning at the current time. Thus, the dynamic POE may vary throughout performance of the entire task/application—i.e., different sub-tasks (or sub-applications) may correspond to different POEs. In one embodiment, the POE associated with each sub-task or sub-application has a timestamp representing its temporal relation with the initial POE associated with the initial position of the machinery when it commences the task/application. The overall task-level or application-level POE (i.e., the static task-level or application-level POE) then corresponds to the union of all possible sub-task-level or sub-application-level POEs (i.e., the dynamic task-level or application-level POEs).

In some embodiments, parameters of the machinery are not known with sufficient precision to support an accurate simulation; in this case, the actual machinery may be run through the entire task/application routine and all joint positions at every point in time during the trajectory are recorded (e.g., by the sensor system 101 and/or the robot controller). Additional characteristics that may be captured during the recording include (i) the position of the tool-center-point in X, Y, Z, R, P, Y coordinates; (ii) the positions of all robot joints in joint space, J1, J2, J3, J4, J5, J6, . . . Jn; and (iii) the maximum achieved speed and acceleration for each joint during the desired motion. The control system 112 may then computationally create the static and/or dynamic task-level (or application-level) POE based on the recorded geometry of the machinery. For example, if the motion of the machinery is captured optically using cameras; the control system 112 may utilize a conventional computer-vision program to spatially map the motion of the machinery in the workspace 100 and, based thereon, create the POE of the machinery. In one embodiment, the range of each joint motion is profiled, and a safety-rated soft-axis limiting in joint space by the robot controller can bound the allowable range that each individual axis can move, thereby truncating the POE of the machinery as the maximum and minimum joint position for a particular application. In this case, the safety-rated limits can be enforced by the robot controller, resulting in a controller-initiated protective stop when, for example, (i) the robot position exceeds the safety-rated limits due to robot failure, (ii) an external position-based application profiling is incomplete, (iii) any observations were not properly recorded, and/or (iv) the application itself was changed to encompass a larger volume in the workspace without recharacterization.

Figure 4:
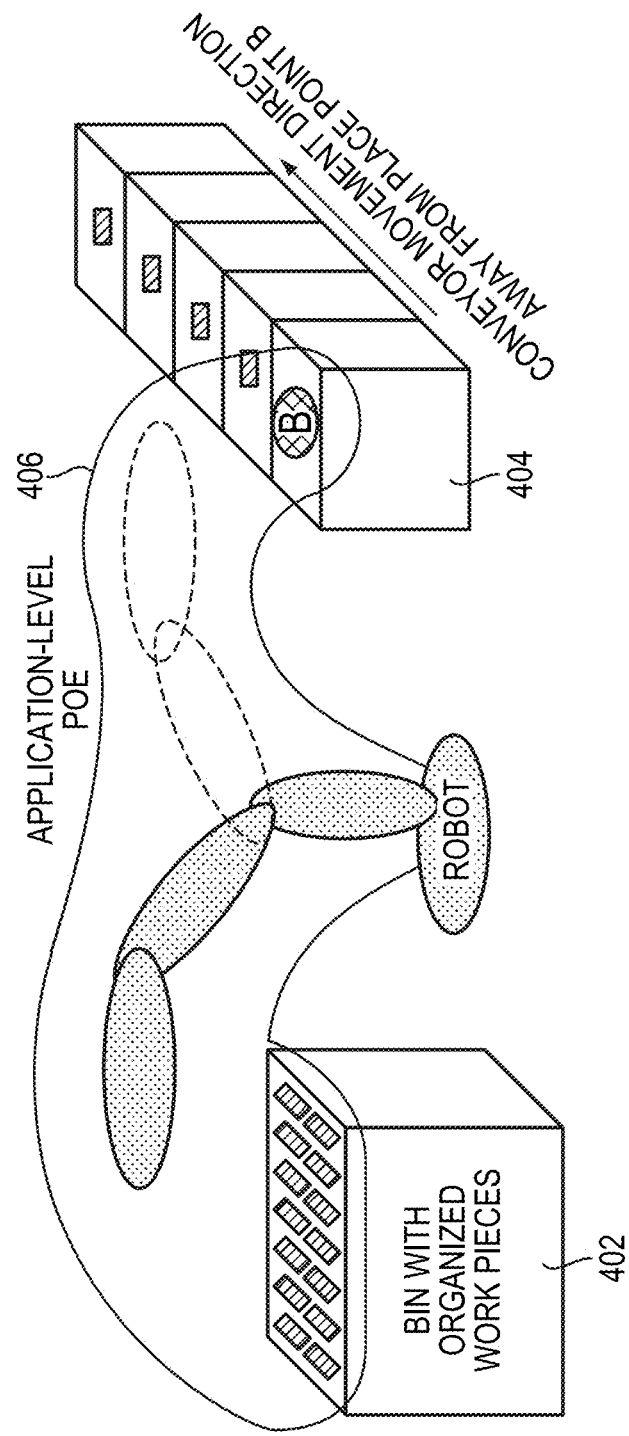
FIG. 4 depicts an exemplary task-level or application-level POE of machinery, in accordance with various embodiments of the present invention, when the trajectory of the machinery does not change once programmed.

A simple example of the task/application-level POE can be seen in FIG. 4, which illustrates a pick-and-place operation that never changes trajectory between an organized bin 402 of parts (or workpieces) and a repetitive place location, point B, on a conveyor belt 404. This operation can be run continuously, with robot positions read over a statistically significant number of cycles, to determine the range of sensor noise. Incorporation of sensor noise into the computation ensures adequate safety by effectively accounting for the worst-case spatial occupancy given sensor error or imperfections. Based on the programmed robotic trajectory and an additional input characterizing the size of the workpiece, the control system 112 may generate an application-level POE 406.

Figure 5A:
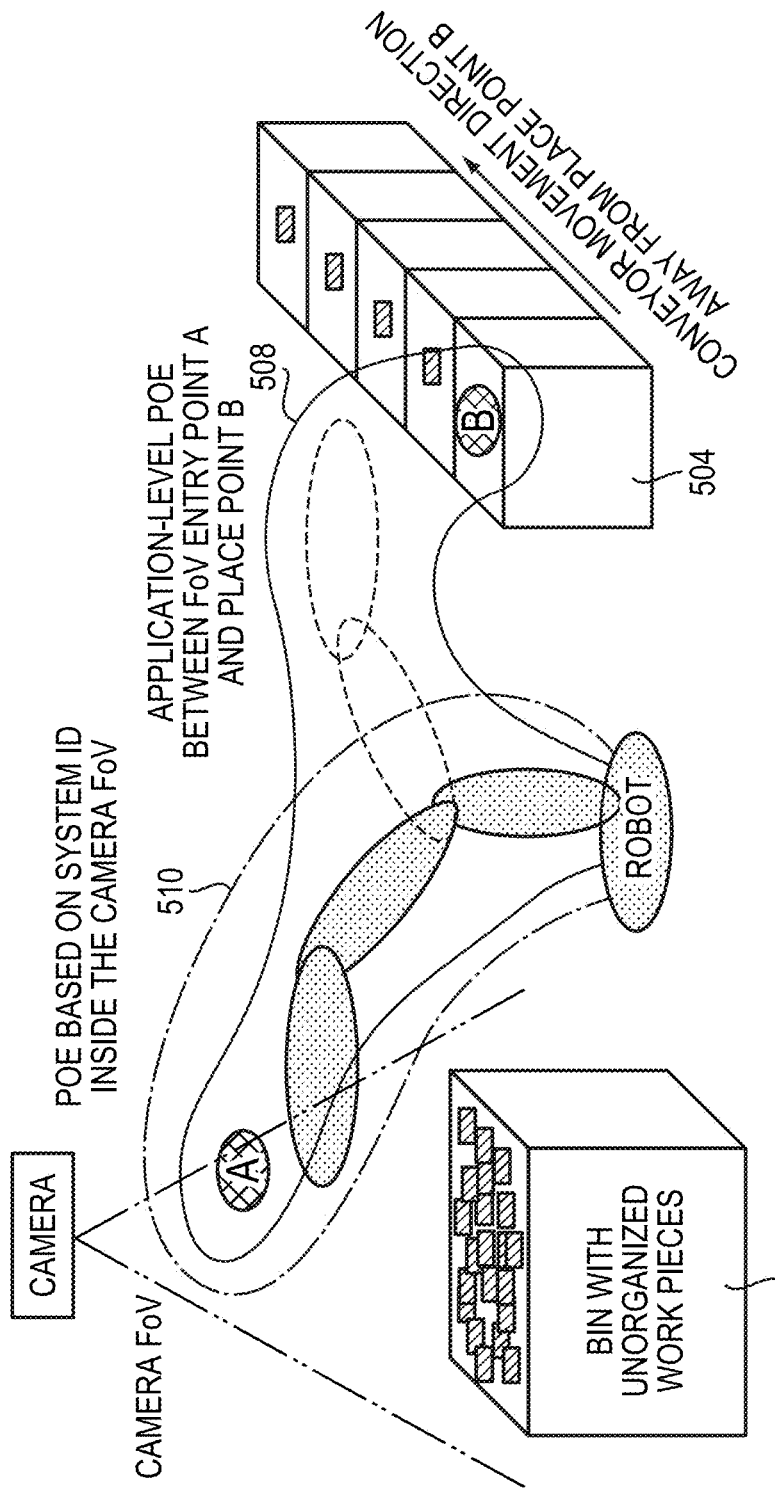
FIGS. 5A and 5B depict exemplary task-level or application-level POEs of the machinery, in accordance with various embodiments of the present invention, when the trajectory of the machinery changes during operation.
Figure 5B:
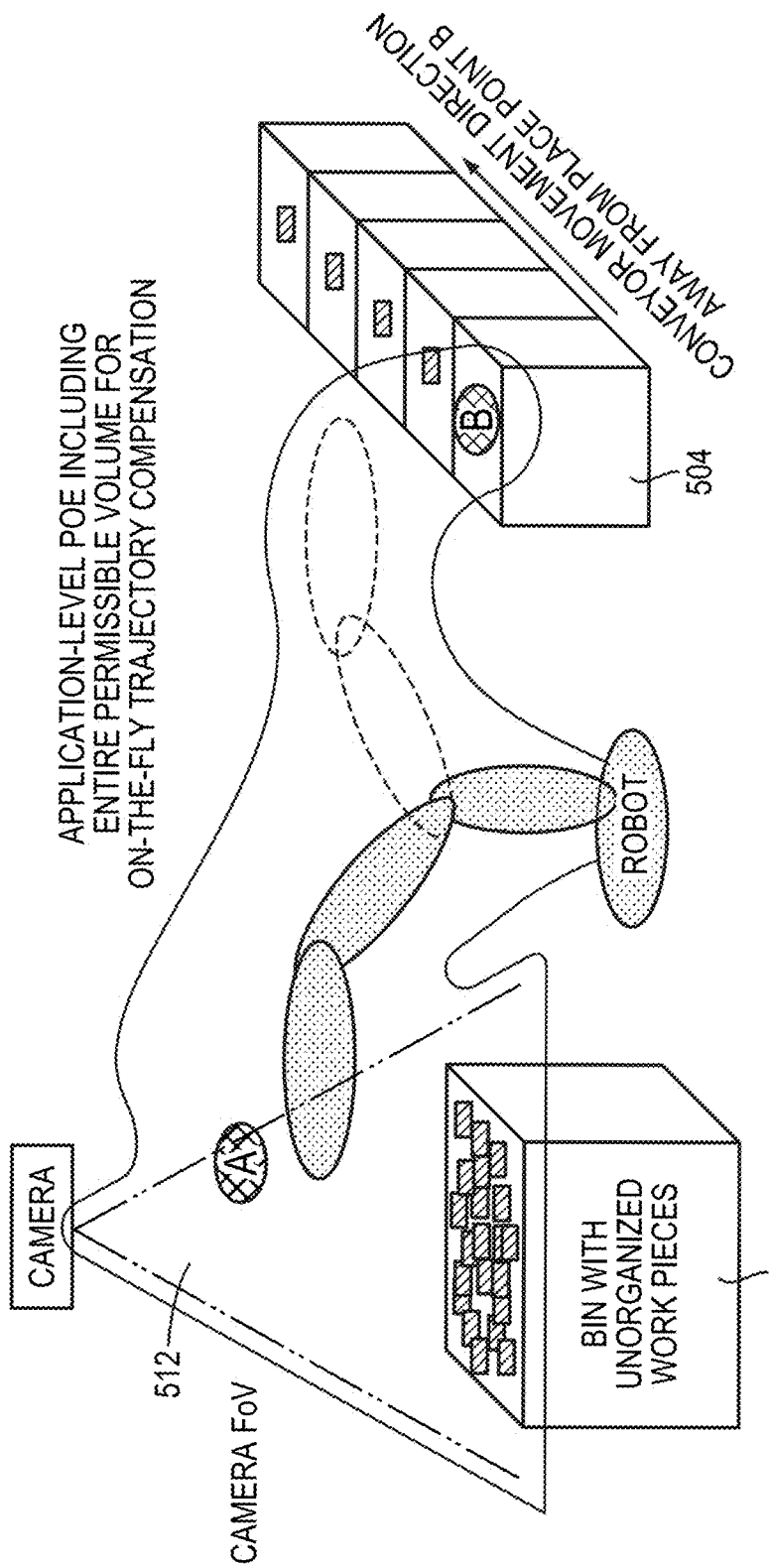

In FIG. 4, there may be no meaningful difference between the static task-level POE and any dynamic POE that may be defined at any point in the execution of the task since the robot trajectory does not vary once programmed. But this may change if, for example, the task is altered during execution and/or the robot trajectory is modified by an external device. FIG. 5A depicts an exemplary robotic application that varies the robotic trajectory during operation; as a result, the application-level POE of the robot is updated in real time accordingly. As depicted, the bin 502 may arrive at a robot workstation full of unorganized workpieces in varying orientations. The robot is programmed to pick each workpiece from the bin 502 and place it at point B on a conveyor belt 504. More specifically, the task may be accomplished by mounting a camera 506 above the bin 502 to determine the position and orientation of each workpiece and causing the robot controller to perform on-the-fly trajectory compensation to pick the next workpiece for transfer to the conveyor belt 504. If point A is defined as the location where the robot always enters and exits the camera's field of view (FoV), the static application-level POE 508 between the FoV entry point A and the place point B is identical to the POE 406 shown in FIG. 4. To determine the POE within the camera's view (i.e., upon the robot entering the entry point A), at least two scenarios can be envisioned. FIG. 5A illustrates the first scenario, where upon crossing through FoV entry point A, the calculation of the POE 510 becomes that of a time-bounded dynamic task-level POE—i.e., the POE 510 may be estimated by computing the region that the robot, as it performs the task, may reach from its current position within a predefined time interval. In the second scenario as depicted in FIG. 5B, a bounded region 512, corresponding to the volume within which trajectory compensation is permissible, is added to the characterized application-level POE 508 between FoV entry point A and place point B. As a result, the entire permissible envelope of on-the-fly trajectory compensation is explicitly constrained in computing the static application-level POE.

In various embodiments, the control system 112 facilitates operation of the machinery based on the determined POE thereof. For example, during performance of a task, the sensor system 101 may continuously monitor the position of the machinery, and the control system 112 may compare the actual machinery position to the simulated POE. If a deviation of the actual machinery position from the simulated POE exceeds a predetermined threshold (e.g., 1 meter), the control system 112 may change the pose (position and/or orientation) and/or the velocity (e.g., to a full stop) of the robot for ensuring human safety. Additionally or alternatively, the control system 112 may preemptively change the pose and/or velocity of the robot before the deviation actually exceeds the predetermined threshold. For example, upon determining that the deviation gradually increases and is approaching the predetermined threshold during execution of the task, the control system 112 may preemptively reduce the velocity of the machinery; this may avoid the situation where the inertia of the machinery causes the deviation to exceed the predetermined threshold.

Figure 6A:
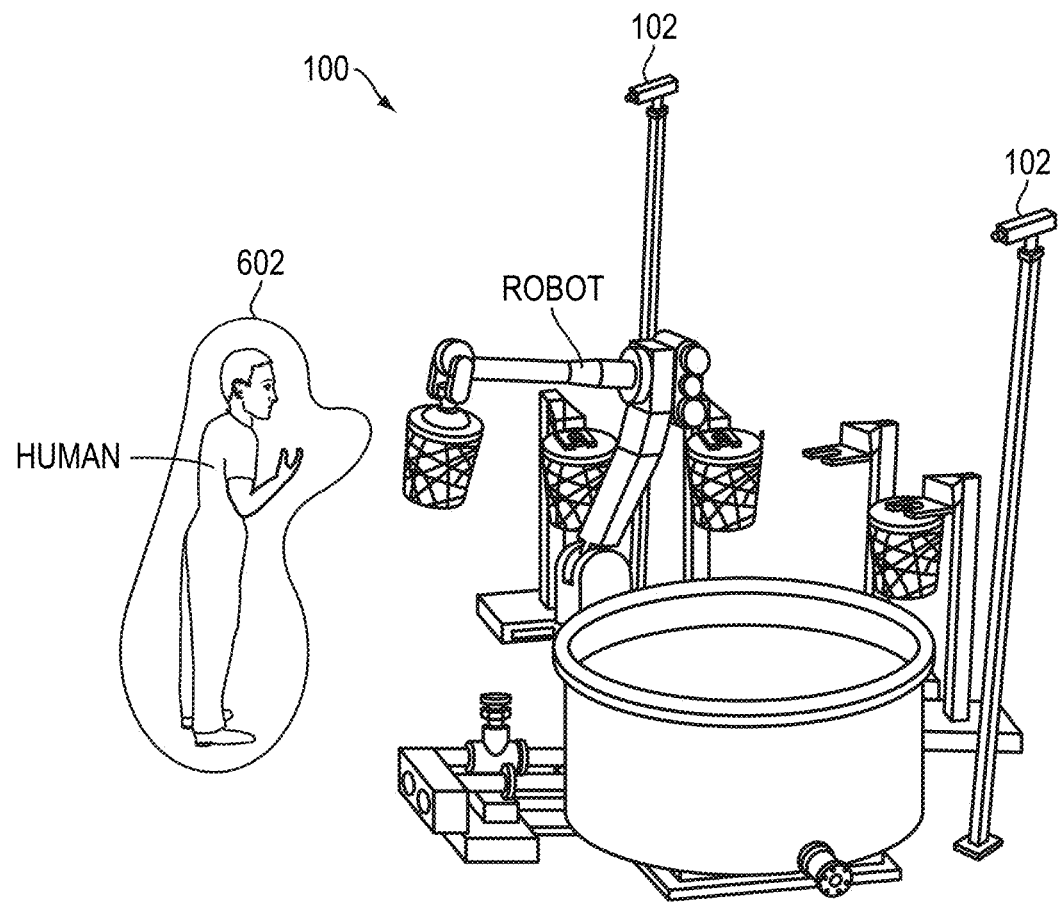
FIGS. 6A and 6B depict exemplary POEs of a human operator in accordance with various embodiments of the present invention.

To fully map the workspace 100 in a human-robot collaborative application, it may be desired to consider the presence and movement of the human operator in the vicinity of the machinery. Thus, in various embodiments, a spatial POE of the human operator that characterizes the spatial region potentially occupied by any portion of the human operator is based on any possible or anticipated movements of the human operator within a defined time interval or during performance of a task or an application; this region is computed and mapped in the workspace. As used herein, the term "possible movements" or "anticipated movements" of the human includes a bounded possible location within the defined time interval based, for example, on ISO 13855 standards defining expected human motion in a hazardous setting. To compute/map the POE of the human operator, the control system 112 may first utilize the sensor system 101 to acquire the current position and/or pose of the operator in the workspace 100. In addition, the control system 112 may determine (i) the future position and pose of the operator in the workspace using a well-characterized human model or (ii) all space presently or potentially occupied by any potential operator based on the assumption that the operator can move in any direction at a maximum operator velocity as defined by the standards such as ISO 13855. Again, the operator's position and pose can be treated as a moment frozen in space at the time of image acquisition, and the operator is assumed to be able to move in any direction with any speed and acceleration consistent with the linear and angular kinematics and dynamics of human motion in the immediate future (e.g., in a time interval, δt, after the image-acquisition moment), or at some maximum velocity as defined by the standards. For example, referring to FIG. 6A, a POE 602 that instantaneously characterizes the spatial region potentially occupied by any portion of the human body in the time interval δt can be computed based on the worst-case scenario (e.g., the furthest distance with the fastest speed) that the human operator can move.

Figure 6B:
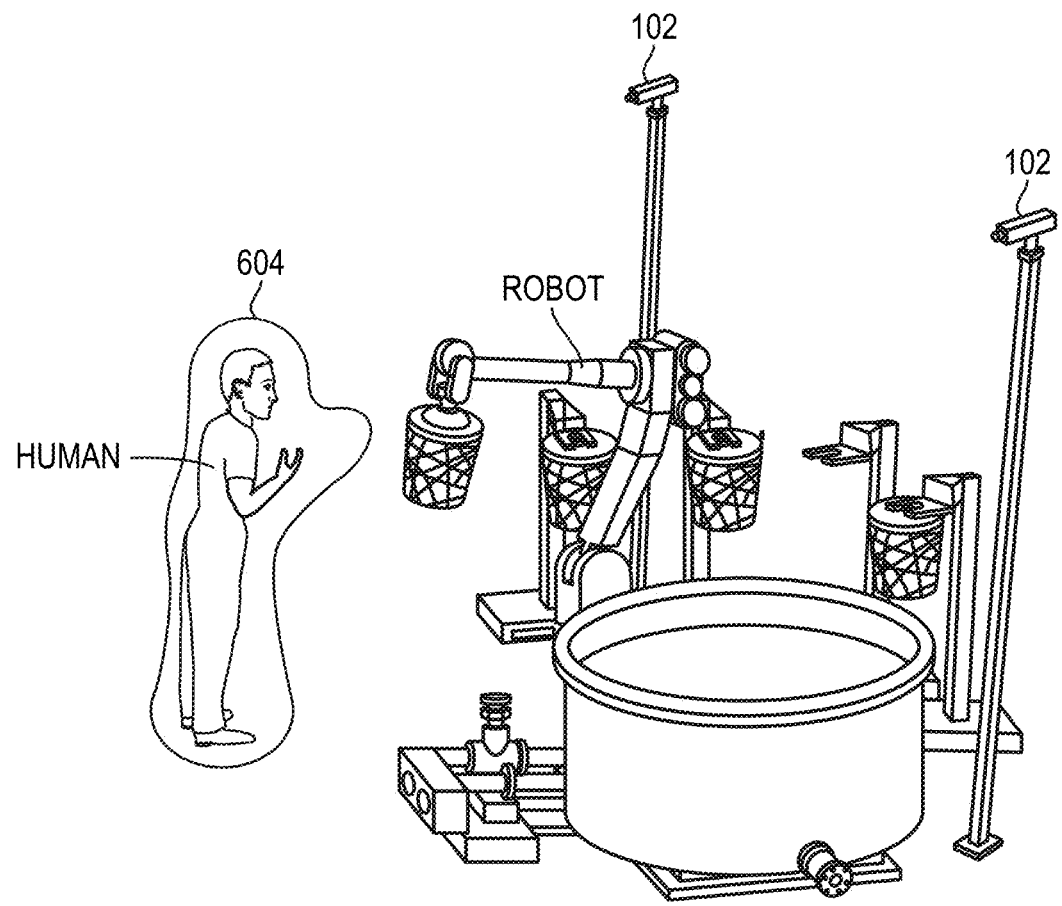

In some embodiments, the POE 602 of the human operator is refined by acquiring more information about the operator. For example, the sensor system 101 may acquire a series of scanning data (e.g., images) within a time interval Δt. By analyzing the operator's positions and poses in the scanning data and based on the time period Δt, the operator's moving direction, velocity and acceleration can be determined. This information, in combination with the linear and angular kinematics and dynamics of human motion, may reduce the potential distance reachable by the operator in the immediate future time δt, thereby refining the POE of the operator (e.g., POE 604 in FIG. 6B). This "future-interval POE" for the operator is analogous to the robot-level POE described above.

Figure 7A:
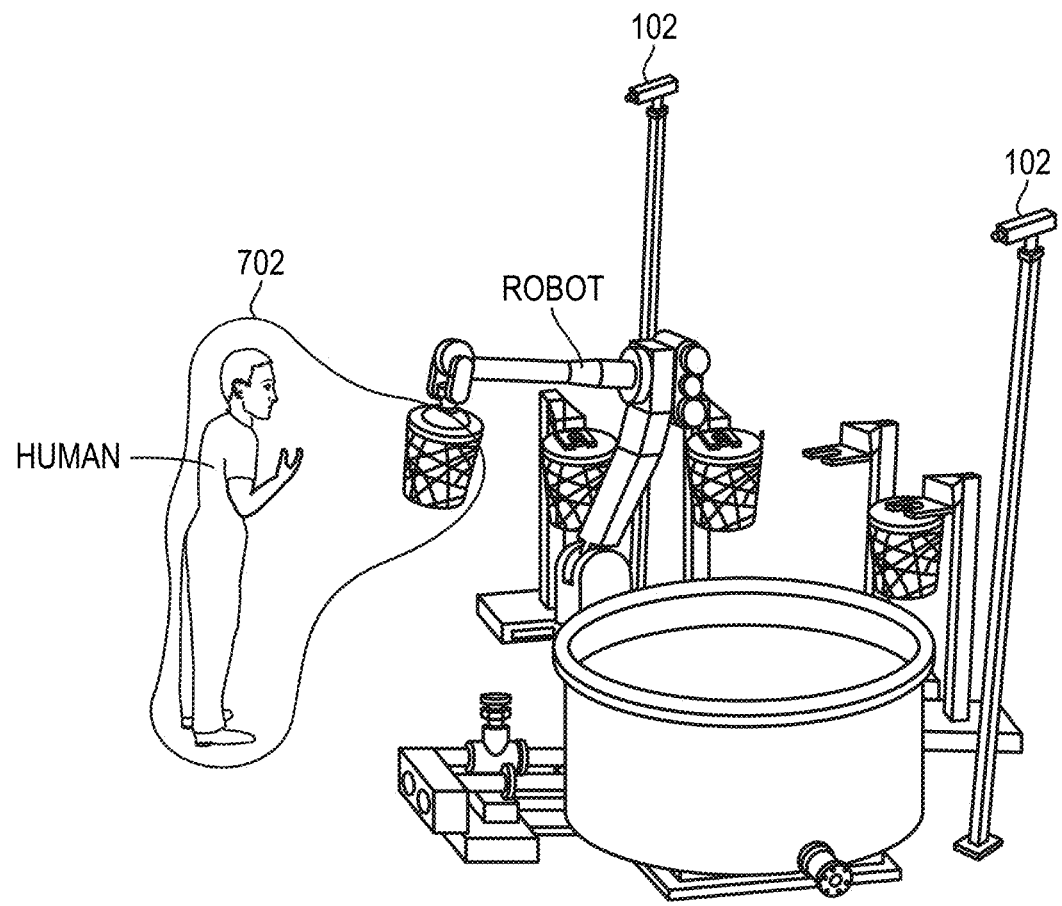
FIG. 7A depicts an exemplary task-level or application-level POE of a human operator when performing a task or an application in accordance with various embodiments of the present invention.
Figure 7B:
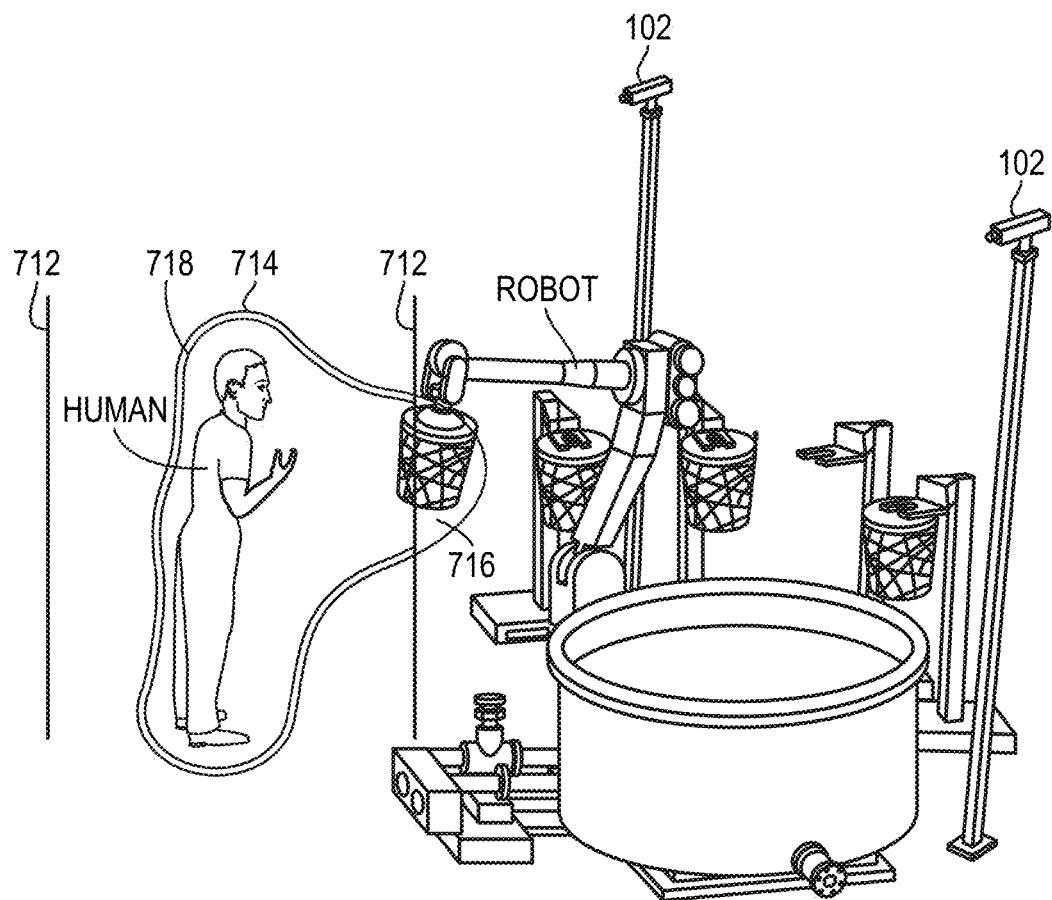
FIG. 7B depicts an exemplary truncated POE of a human operator in accordance with various embodiments of the present invention.

In addition, similar to the POE of the machinery above, the POE of the human operator can be established at an application/task level. For example, referring to FIG. 7, based on the particular task that the operator is required to perform, the location(s) of the resources (e.g., workpieces or equipment) associated with the task, and the linear and angular kinematics and dynamics of human motion, the spatial region that is potentially (or likely) reachable by the operator during performance of the particular task can be computed. The POE 702 of the operator can be defined as the voxels of the spatial region potentially reachable by the operator during performance of the particular task. In some embodiments, the operator may carry a workpiece (e.g., a large but light piece of sheet metal) to an operator-load station for performing the task/application. In this situation, the POE of the operator may be computed by including the geometry of the workpiece, which again, may be acquired by, for example, the sensor system 101.

Further, the POE of the human operator may be truncated based on workspace configuration. For example, referring to FIG. 7B, the workspace may include a physical fence 712 defining the area where the operator can perform a task. Thus, even though the computed POE 714 of the operator indicates that the operator may reach a region 716, the physical fence 712 restricts this movement. As a result, a truncated POE 718 of the operator excluding the region 716 in accordance with the location of the physical fence 712 can be determined. In some embodiments, the workspace includes a turnstile or a type of door that, for example, always allows exit but only permits entry to a collaborative area during certain points of a cycle. Again, based on the location and design of the turnstile/door, the POE of the human operator may be adjusted (e.g., truncated).

Figure 8A:
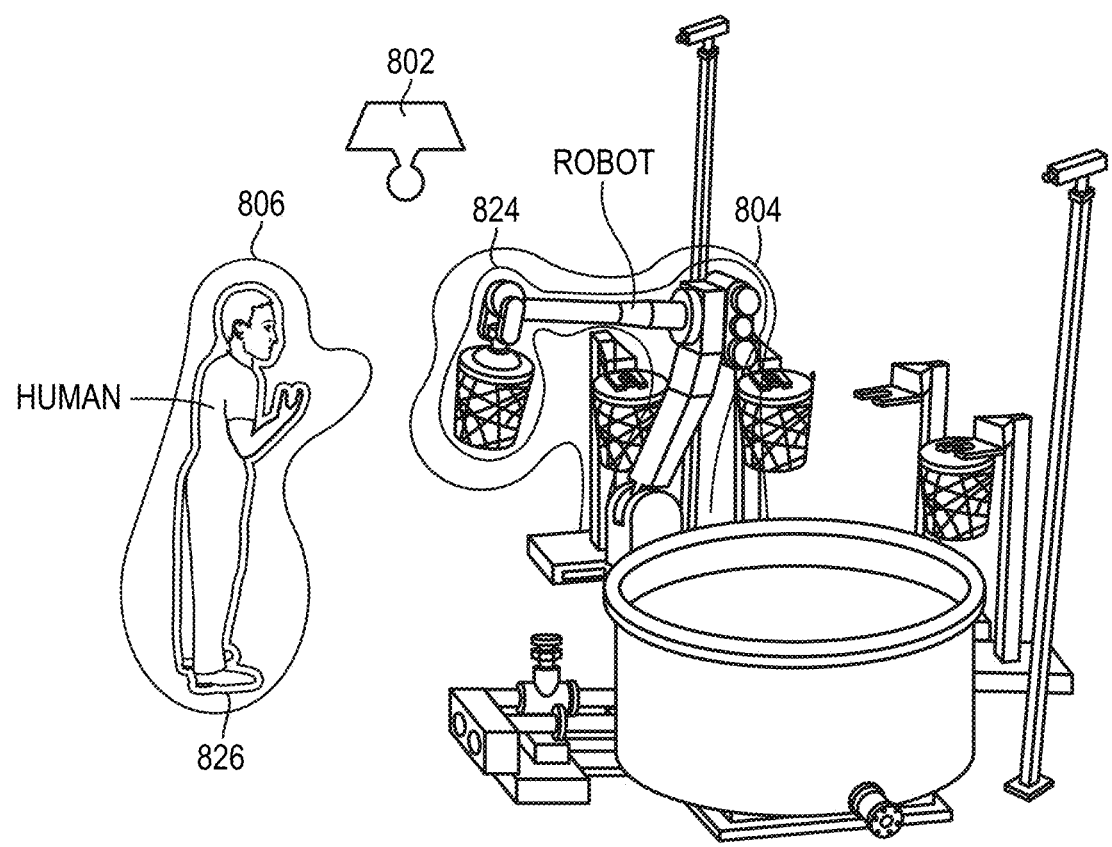
FIGS. 8A and 8B illustrate display of the POEs of the machinery and human operator in accordance with various embodiments of the present invention.
Figure 8B:
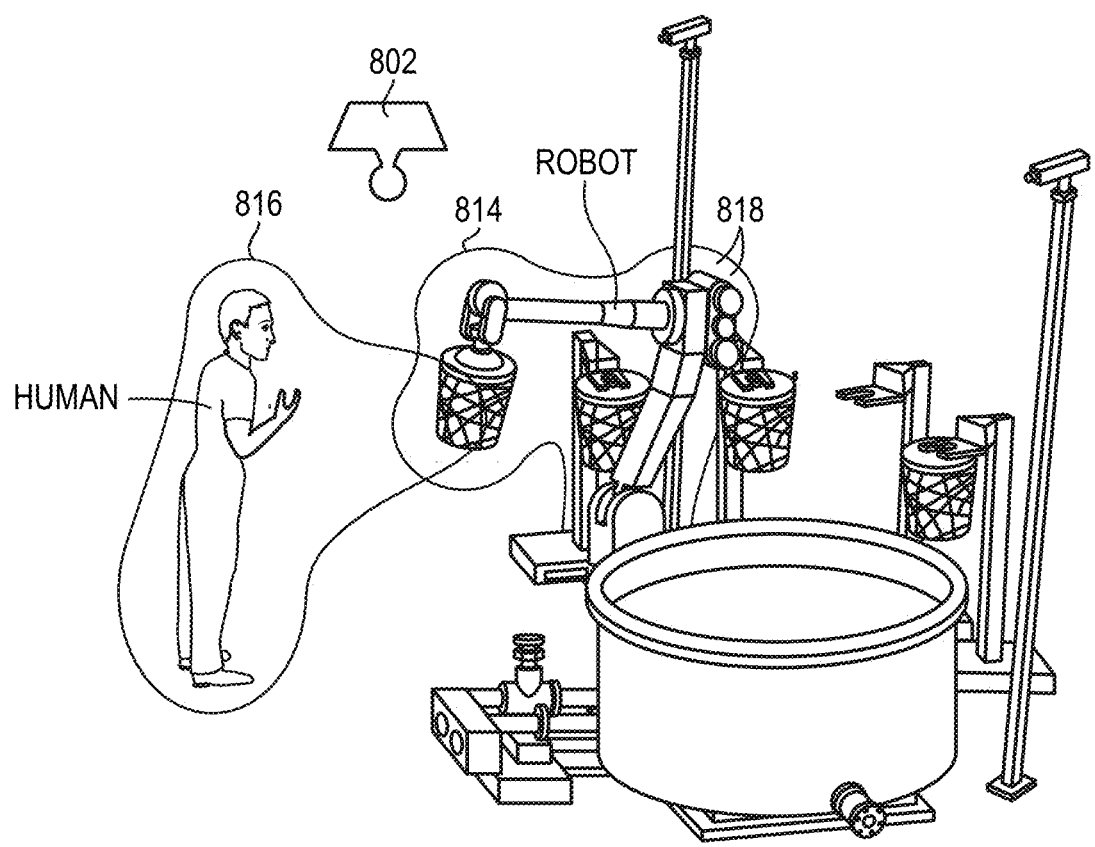

The robot-level POE (and/or application-level POE) of the machinery and/or the future-interval POE (and/or application-level POE) of the human operator may be used to show the operator where to stand and/or what to do during a particular part of the task using suitable indicators (e.g., lights, sounds, displayed visualizations, etc.), and an alert can be raised if the operator unexpectedly leaves the operator POE. In one embodiment, the POEs of the machinery and human operator are both presented on a local display or communicated to a smartphone or tablet application (or other methods, such as augmented reality (AR) or virtual reality (VR)) for display thereon. For example, referring to FIG. 8A, the display 802 may depict the POE 804 of the robot and the POE 806 of the human operator in the immediate future time δt. Alternatively, referring to FIG. 8B, the display 802 may show the largest POE 814 of the robot and the largest POE 816 of the operator during execution of a particular task. In addition, referring again to FIG. 8A, the display 802 may further illustrate the spatial regions 824, 826 that are currently occupied by the robot and operator, respectively; the currently occupied regions 824, 826 may be displayed in a sequential or overlapping manner with the POEs 804 and 806 of the robot and the operator. Displaying the POEs thus allows the human operator to visualize the spatial regions that are currently occupied and will be potentially occupied by the machinery and the operator himself; this may further ensure safety and promote more efficient planning of operator motion based on knowledge of where the machinery will be at what time.

In some embodiments, the machinery is operated based on the POE thereof, the POE of the human operator, and/or a safety protocol that specifies one or more safety measures (e.g., a minimum separation distance or a protective separation distance (PSD) between the machinery and the operator as further described below, a maximum speed of the machinery when in proximity to a human, etc.). For example, during performance of a particular task, the control system 112 may restrict or alter the robot operation based on proximity between the POEs of the robot and the human operator for ensuring that the safety measures in the protocol are satisfied. For example, upon determining that the POEs of the robot and the human operator in the next moment may overlap, the control system 112 may bring the robot to a safe state (e.g., having a reduced speed and/or a different pose), thereby avoiding a contact with the human operator in proximity thereto. The control system 112 may directly control the operation and state of the robot or, alternatively, may send instructions to the robot controller 108 that then controls the robotic operation/state based on the received instructions as further described below.

In addition, the degree of alternation of the robot operation/state may depend on the degree of overlap between the POEs of the robot and the operator. For example, referring again to FIG. 8B, the POE 814 of the robot may be divided into multiple nested, spatially distinct 3D subzones 818; in one embodiment, the more subzones 818 that overlap the POE 816 of the human operator, the larger the degree by which the robot operation/state is altered (e.g., having a larger decrease in the speed or a larger degree of change in the orientation).

In various embodiments, based on the computed robot-level POE 804, future-interval POE 806 of the human operator, or dynamic and/or static application-level POEs 814, 816 of the machinery and human operator for performing a specific action or an entire task, the workspace parameter (such as the dimensions thereof, the workflow, the locations of the resources, etc.) can be modeled to achieve high productivity and spatial efficiency while ensuring safety of the human operator. For example, based on the static task-level POE 814 of the machinery and the largest computed POE 816 of the operator during execution of the task, the minimum dimensions of the workcell can be determined. In addition, the locations and/or orientations of the equipment and/or resources (e.g., the robot, conveyor belt, workpieces) in the workspace can be arranged such that they are easily reachable by the machinery and/or operator while minimizing the overlapped region between the POEs of the machinery and the operator in order to ensure safety. In one embodiment, the computed POEs of the machinery and/or human operator are combined with a conventional spatial modeling tool (e.g., supplied by Delmia Global Operations or Siemens Tecnomatix) to model the workspace. For example, the POEs of the machinery and/or human operator may be used as input modules to the conventional spatial modeling tool so as to augment their capabilities to include the human-robot collaboration when designing the workspace and/or workflow of a particular task.

In various embodiments, the dynamic task-level POE of the machinery and/or the task-level POE of the operator is continuously updated during actual execution of the task; such updates can be reflected on the display 802. For example, during execution of the task, the sensor system 101 may periodically scan the machinery, human operator and/or workspace. Based on the scanning data, the poses (e.g., positions and/or orientation) of the machinery and/or human operator can be updated. In addition, by comparing the updated poses with the previous poses of the machinery and/or human operator, the moving directions, velocities and/or accelerations associated with the machinery and operator can be determined. In various embodiments, based on the updated poses, moving directions, velocities and/or accelerations, the POEs of the machinery and operator in the next moment (i.e., after a time increment) can be computed and updated. Additionally, as explained above, the POEs of the machinery and/or human operator may be updated by further taking into account next actions that are specified to be performed in the particular task.

In some embodiments, the continuously updated POEs of the machinery and the human operator are provided as feedback for adjusting the operation of the machinery and/or other setup in the workspace to ensure safety as further described below. For example, when the updated POEs of the machinery and the operator indicate that the operator may be too close to the robot (e.g., a distance smaller than the minimum separation distance defined in the safety protocol), either at present or within a fixed interval (e.g., the robot stopping time), a stop command may be issued to the machinery. In one embodiment, the scanning data of the machinery and/or operator acquired during actual execution of the task is stored in memory and can be used as an input when modeling the workflow of the same human-robot collaborative application in the workspace next time.

In addition, the computed POEs of the machinery and/or human operator may provide insights when determining an optimal path of the machinery for performing a particular task. For example, as further described below, multiple POEs of the operator may be computed based on his/her actions to be performed for the task. Based on the computed POEs of the human operator and the setup (e.g., locations and/or orientations) of the equipment and/or resources in the workspace, the moving path of the machinery in the workspace for performing the task can be optimized so as to maximize the productivity and space efficiency while ensuring safety of the operator.

Figure 9A:
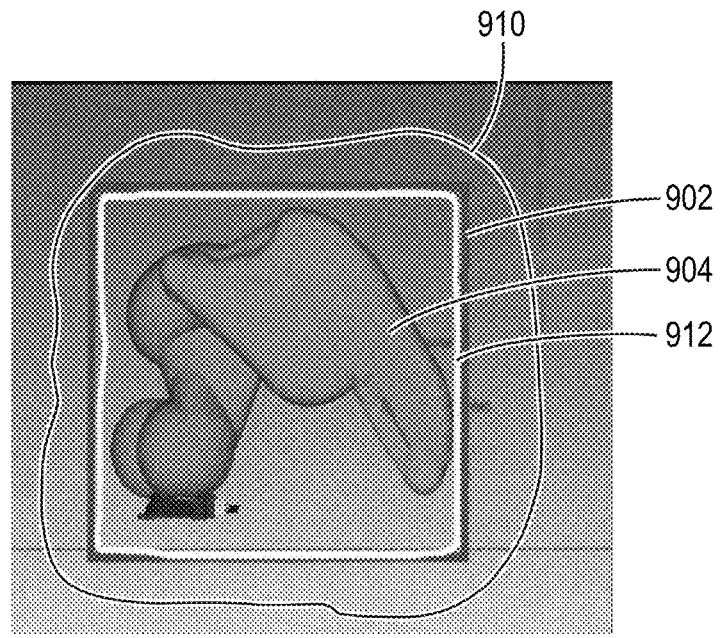
FIGS. 9A and 9B depict exemplary keep-in zones associated with the machinery in accordance with various embodiments of the present invention.

In some embodiments, path optimization includes creation of a 3D "keep-in" zone (or volume) (i.e., a zone/volume to which the robot is restricted during operation) and/or a "keep-out" zone (or volume) (i.e., a zone/volume from which the robot is restricted during operation). Keep-in and keep-out zones restrict robot motion through safe limitations on the possible robot axis positions in Cartesian and/or joint space. Safety limits may be set outside these zones so that, for example, their breach by the robot in operation triggers a stop. Conventionally, robot keep-in zones are defined as prismatic bodies. For example, referring to FIG. 9A, a keep-in zone 902 determined using the conventional approach takes the form of a prismatic volume; the keep-in zone 902 is typically larger than the total swept volume 904 of the machinery during operation (which may be determined either by simulation or characterization using, for example, scanning data acquired by the sensor system 101). Based on the determined keep-in zone 902, the robot controller may implement a position-limiting function to enforce the position limiting of the machinery to be within the keep-in zone 902.

Figure 9B:
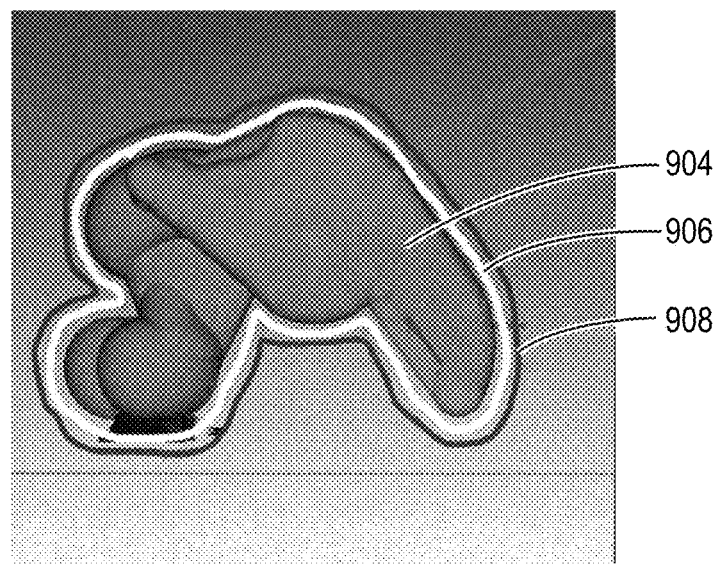

The machinery path determined based on prismatic volumes, however, may not be optimal. In addition, complex robot motions may be difficult to represent as prismatic volumes due to the complex nature of their surfaces and the geometry of the end effectors and workpieces mounted on the robot; as a result, the prismatic volume will be larger than necessary for safety. To overcome this challenge and optimize the moving path of the machinery for performing a task, various embodiments establish and store in memory the swept volume of the machinery (including, for example, robot links, end effectors and workpieces) throughout a programmed routine (e.g., a POE of the machinery), and then define the keep-in zone based on the POE as a detailed volume composed of, e.g., mesh surfaces, NURBS or T-spline solid bodies. That is, the keep-in zone may be arbitrary in shape and not assembled from base prismatic volumes. For example, referring to FIG. 9B, a POE 906 of the machinery may be established by recording the motion of the machinery as it performs the application or task, or alternatively, by a computational simulation defining performance of the task (and the spatial volume within which the task takes place). The keep-in zone 908 defined based on the POE 906 of the machinery thus includes a much smaller region compared to the conventional keep-in zone 902. Because the keep-in zone 908 is tailored based on the specific task/application it executes (as opposed to the prismatic volume offered by conventional modelling tools), a smaller machine footprint can be realized. This may advantageously allow more accurate determination of the optimal path for the machinery when performing a particular task and/or design of a workspace or workflow. In various embodiments, the keep-in zone is enforced by the control system 112, which can transmit instructions to the robot controller to restrict movement of the machinery as further described below. For example, upon detecting that a portion of the machinery is outside (or is predicted to exit) the keep-in zone 908, the control system 112 may issue a stop command to the robot controller, which can then cause the machinery to fully stop.

As described above, the POE of the machinery may be static or dynamic, and may be robot-level or task-level. A static, robot-level POE represents the entire spatial region that the machinery may possibly reach within a specified time, and thus corresponds to the most conservative possible safety zone; a keep-in zone determined based on the static robot-level POE may not be truly a keep-in zone because the machinery's movements are not constrained. If the machinery is stopped or slowed down when a human reaches a prescribed separation distance from any outer point of this zone, the machinery's operation may be curtailed even when intrusions are distant from its near-term reach. A static, task-level POE reduces the volume or distance within which an intrusion will trigger a safety stop or slowdown to a specific task-defined volume and consequently reduces potential robot downtime without compromising human safety. Thus, the keep-in zone determined based on the static, task-level POE of the machinery is smaller than that determined based on the static, robot-level POE. A dynamic, task-level or application-level POE of the machinery may further reduce the POE (and thereby the keep-in zone) based on a specific point in the execution of a task by the machinery. A dynamic task-level POE achieves the smallest sacrifice of productive robot activity while respecting safety guidelines.

Alternatively, the keep-in zone may be defined based on the boundary of the total swept volume 904 of the machinery during operation or slight padding/offset of the total swept volume 904 to account for measurement or simulation error. This approach may be utilized when, for example, the computed POE of the machinery is sufficiently large. For example, referring again to FIG. 9A, the computed POE 910 of the machinery may be larger than the keep-in zone 902. But because the machinery cannot move outside the keep-in zone 902, the POE 910 has to be truncated based on the prismatic geometry of the keep-in zone 902. The truncated POE 912, however, also involves a prismatic volume, so determining the machinery path based thereon may thus not be optimal. In contrast, referring again to FIG. 9B, the POE 906 truncated based on the application/task-specific keep-in zone 908 may include a smaller volume that is tailored to the application/task being executed; thereby allowing more accurate determination of the optimal path for the machinery and/or design of a workspace or workflow.

In various embodiments, the actual or potential movement of the human operator is evaluated against the robot-level or application-level POE of the machinery to define the keep-in zone. Expected human speeds in industrial environments are referenced in ISO 13855:2010, ISO 61496-1:2012 and ISO 10218:2011. For example, human bodies are expected to move no faster than 1.6 m/s and human extremities are expected to move no faster than 2 m/s. In one embodiment, the points reachable by the human operator in a given unit of time is approximated by a volume surrounding the operator, which can be defined as the human POE as described above. If the human operator is moving, the human POE moves with her. Thus, as the human POE approaches the task-level POE of the robot, the latter may be reduced in dimension along the direction of human travel to preserve it. In one embodiment, this reduced task-level POE of the robot (which varies dynamically based on the tracked and/or estimated movement of the operator) is defined as a keep-in zone. So long as the robot can continue performing elements of the task within the smaller (and potentially shrinking) POE (i.e., keep-in zone), the robot can continue to operate productively; otherwise, it may stop. Alternatively, the dynamic task-level POE of the machinery may be reduced in response to an advancing human by slowing down the machinery as further described below. This permits the machinery to keep working at a slower rate rather than stopping completely. Moreover, slower machinery movement may in itself pose a lower safety risk.

In various embodiments, the keep-in and keep-out zones are implemented in the machinery having separate safety-rated and non-safety-rated control systems, typically in compliance with an industrial safety standard. Safety architectures and safety ratings are described, for example, in U.S. Patent Publ. No. 2020/0272123, entitled "Safety-Rated Processor System Architecture," filed on Feb. 25, 2020, the entire contents of which are hereby incorporated by reference. Non-safety-rated systems, by contrast, are not designed for integration into safety systems (e.g., in accordance with the safety standard).

Figure 10:
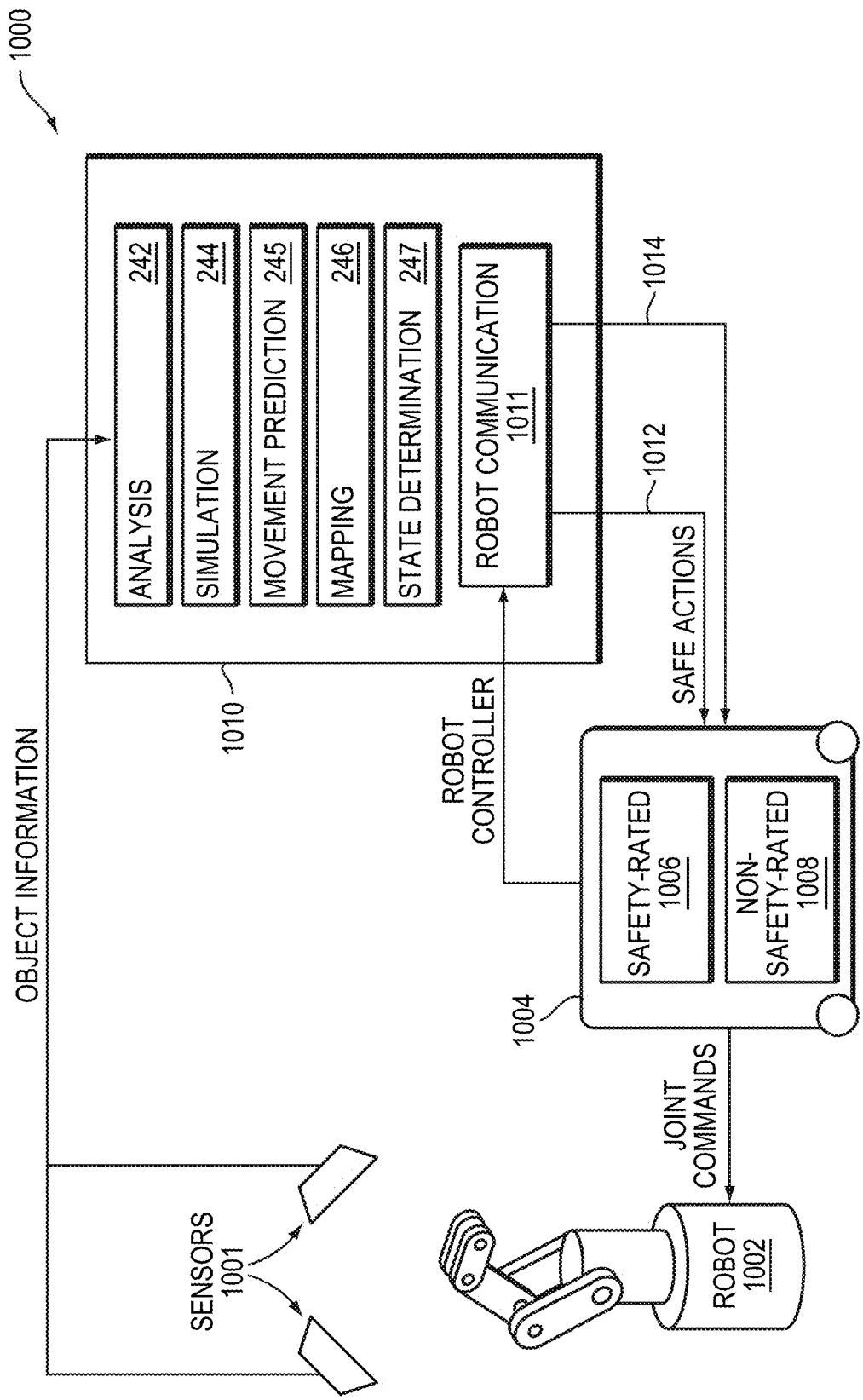
FIG. 10 schematically illustrates an object-monitoring system in accordance with various embodiments of the present invention.

Operation of the safety-rated and non-safety-rated control systems is best understood with reference to the conceptual illustration of system organization and operation of FIG. 10. As described above, a sensor system 1001 monitors the workspace 1000, which includes the machinery (e.g., a robot) 1002. Movements of the machinery are controlled by a conventional robot controller 1004, which may be part of or separate from the robot itself; for example, a single robot controller may issue commands to more than one robot. The robot's activities may primarily involve a robot arm, the movements of which are orchestrated by the robot controller 1004 using joint commands that operate the robot arm joints to effect a desired movement. In various embodiments, the robot controller 1004 includes a safety-rated component (e.g., a functional safety unit) 1006 and a non-safety-rated component 1008. The safety-rated component 1006 may enforce the robot's state (e.g., position, orientation, speed, etc.) such that the robot is operated in a safe manner. The safety-rated component 1006 typically incorporates a closed control loop together with the electronics and hardware associated with machine control inputs. The non-safety-rated component 1008 may be controlled externally to change the robot's state (e.g., slow down or stop the robot) but not in a safe manner—i.e., the non-safety-rated component cannot be guaranteed to change the robot's state, such as slowing down or stopping the robot, within a determined period of time for ensuring safety. In one embodiment, the non-safety-rated component 1008 contains the task-level programming that causes the robot to perform an application. The safety-rated component 1006, by contrast, may perform only a monitoring function, i.e., it does not govern the robot motion—instead, it only monitors positions and velocities (e.g., based on the machine state maintained by the non-safety-rated component 1008) and issues commands to safely slow down or stop the robot if the robot's position or velocity strays outside predetermined limits. Commands from the safety-rated monitoring component 1006 may override robot movements dictated by the task-level programming or other non-safety-rated control commands.

Typically, the robot controller 1004 itself does not have a safe way to govern (e.g., modify) the state (e.g., speed, position, etc.) of the robot; rather, it only has a safe way to enforce a given state. To govern and enforce the state of the robot in a safe manner, in various embodiments, an object-monitoring system (OMS) 1010 is implemented to cooperatively work with the safety-rated component 1006 and non-safety-rated component 1008 as further described below. In one embodiment, the OMS 1010 obtains information about objects from the sensor system 1001 and uses this sensor information to identify relevant objects in the workspace 1000. For example, OMS 1010 may, based on the information obtained from the sensor system (and/or the robot), monitor whether the robot is in a safe state (e.g., remains within a specific zone (e.g., the keep-in zone), stays below a specified speed, etc.), and if not, issues a safe-action command (e.g., stop) to the robot controller 1004.

For example, OMS 1010 may determine the current state of the robot and/or the human operator and computationally generate a POE for the robot and/or a POE for the human operator when performing a task in the workspace 1000. The POEs of the robot and/or human operator may then be transferred to the safety-rated component for use as a keep-in zone as described above. Alternatively, the POEs of the robot and/or human operator may be shared by the safety-rated and non-safety-rated control components of the robot controller. OMS 1010 may transmit the POEs and/or safe-action constraints to the robot controller 1004 via any suitable wired or wireless protocol. (In an industrial robot, control electronics typically reside in an external control box. However, in the case of a robot with a built-in controller, OMS 1010 communicates directly with the robot's onboard controller.) In various embodiments, OMS 1010 includes a robot communication module 1011 that communicates with the safety-rated component 1006 and non-safety-rated component 1008 via a safety-rated channel (e.g., digital I/O) 1012 and a non-safety-rated channel (e.g., an Ethernet connector) 1014, respectively. In addition, when the robot violates the safety measures specified in the safety protocol, OMS 1010 may issue safety commands to the robot controller 1004 via both the safety-rated and non-safety-rated channels. For example, upon determining that the robot speed exceeds a predetermined maximum speed when in proximity to the human (or the robot is outside the keep-in zone or the PSD exceeds the predetermined threshold), OMS 1010 may first issue a command to the non-safety-rated component 1008 via the non-safety-rated channel 1014 to reduce the robot speed to a desired value (e.g., below or at the maximum speed), thereby reducing the dynamic POE of the robot. This action, however, is non-safety-rated. Thus, after the robot speed is reduced to the desired value (or the dynamic POE of the robot is reduced to the desired size), OMS 1010 may issue another command to the safety-rated component 1008 via the safety-rated channel 1012 such that the safety-rated component 1008 can enforce a new robot speed, which is generally higher than the reduced robot speed (or a new keep-in zone based on the reduced dynamic POE of the robot). Accordingly, various embodiments effectively "safety rate" the function provided by the non-safety-rated component 1008 by causing the non-safety-rated component 1008 to first reduce the speed or dynamic POE of the robot in spatial extent in an unsafe way, and then engaging the safety-rated (e.g., monitoring) component to ensure that the robot remains in the now-reduced speed (or, within the now-reduced POE, as a new keep-in zone). Similar approaches can be implemented to increase the speed or POE of the robot in a safe manner during performance of the task. (It will be appreciated that, with reference to FIG. 2, the functions of OMS 1010 described above are performed in a control system 112 by analysis module 242, simulation module 244, movement-prediction module 245, mapping module 246, state determination module 247 and, in some cases, the control routines 252.)

Similarly, the keep-out zone may be determined based on the POE of the human operator. Again, a static future-interval POE represents the entire spatial region that the human operator may possibly reach within a specified time, and thus corresponds to the most conservative possible keep-out zone within which an intrusion of the robot will trigger a safety stop or slowdown. A static task-level POE of the human operator may reduce the determined keep-out zone in accordance with the task to be performed, and a dynamic, task-level or application-level POE of the human may further reduce the keep-out zone based on a specific point in the execution of a task by the human. In addition, the POE of the human operator can be shared by the safety-rated and non-safety-rated control components as described above for operating the robot in a safe manner. For example, upon detecting intrusion of the robot in the keep-out zone, the OMS 1010 may issue a command to the non-safety-rated control component to slow down the robot in an unsafe way, and then engaging the safety-rated robot control (e.g., monitoring) component to ensure that the robot remains outside the keep-out zone or has a speed below the predetermined value.

Figure 11A:
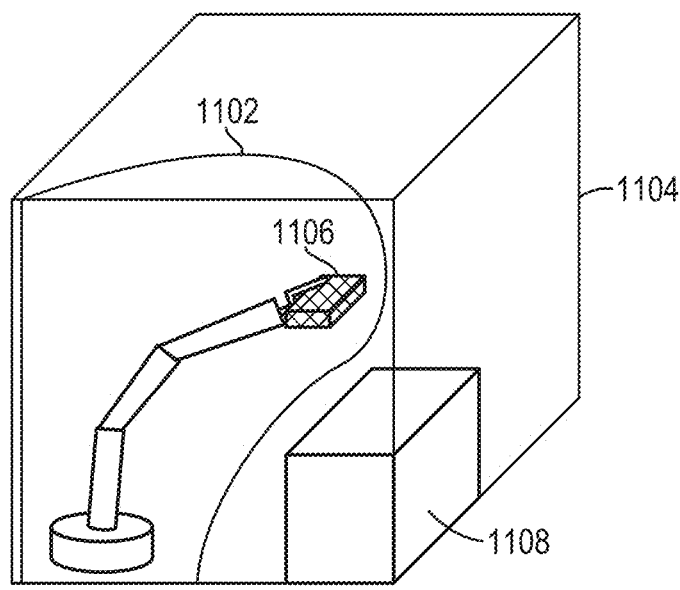
FIGS. 11A and 11B depict dynamically updated POEs of the machinery in accordance with various embodiments of the present invention.
Figure 11B:
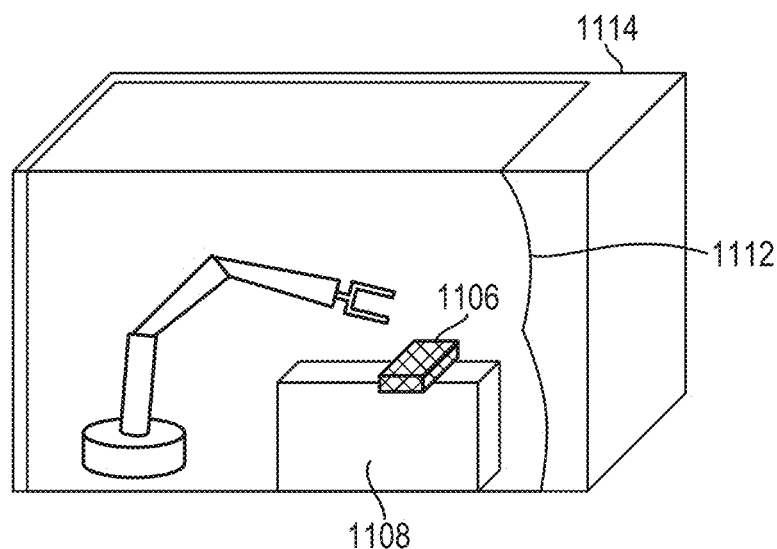

Once the keep-in zone and/or keep-out zone are defined, the machinery is safely constrained within the keep-in zone, or prevented from entering the keep-out zone, reducing the POE of the machinery as discussed above. Further, path optimization may include dynamic changing or switching of zones throughout the task, creating multiple POEs of different sizes, in a similar way as described for the operator. Moreover, switching of these dynamic zones may be triggered not only by a priori knowledge of the machinery program as described above, but also by the instantaneous detected location of the machinery or the human operator. For example, if a robot is tasked to pick up a part, bring it to a fixture, then perform a machining operation on the part, the POE of the robot can be dynamically updated based on safety-rated axis limiting at different times within the program. FIGS. 11A and 11B illustrate this scenario. FIG. 11A depicts the robot POE 1102 truncated by a large keep-in zone 1104, allowing the robot to pick up a part 1106 and bring it to a fixture 1108. Upon placement of the part 1106 in the fixture 1108 and while the robot is performing a machining task on the part 1106, as shown in FIG. 11B, the keep-in zone 1114 is dynamically switched to a smaller state, further truncating the POE 1112 during this part of the robot program.

Figure 12A:
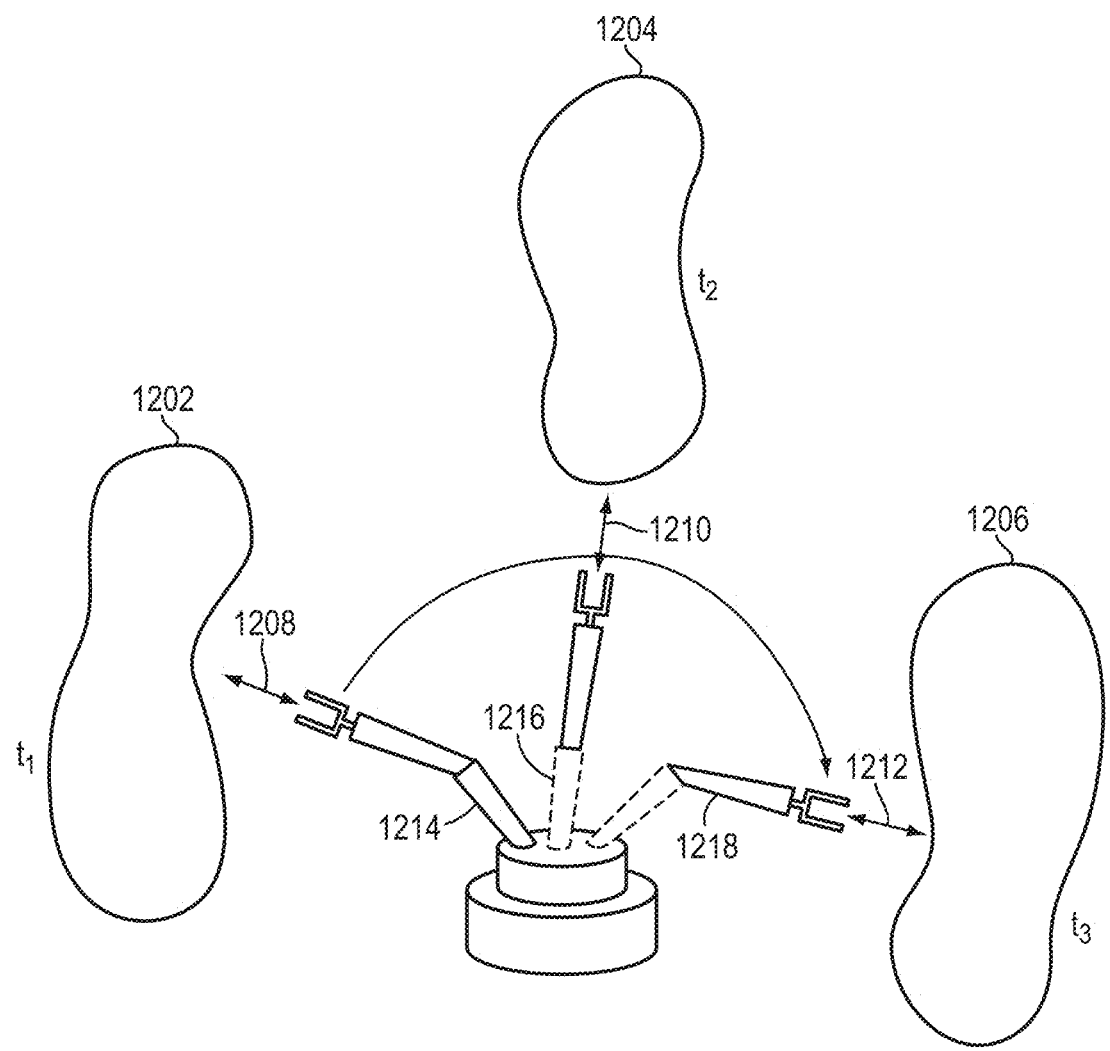
FIG. 12A depicts an optimal path for the machinery when performing a task or an application in accordance with various embodiments of the present invention.

Additionally or alternatively, once the machinery's current state (e.g., payload, position, orientation, velocity and/or acceleration) is acquired, a PSD (generally defined as the minimum distance separating the machinery from the operator for ensuring safety) and/or other safety-related measures can be computed. For example, the PSD may be computed based on the POEs of the machinery and the human operator as well as any keep-in and/or keep-out zones. Again, because the machinery's state may change during execution of the task, the PSD may be continuously updated throughout the task as well. This can be achieved by, for example, using the sensor system 101 to periodically acquire the updated state of the machinery and the operator, and, based thereon, updating the PSD. In addition, the updated PSD may be compared to a predetermined threshold; if the updated PSD is smaller than the threshold, the control system 112 may adjust (e.g., reduce), for example, the speed of the machinery as further described below so as to bring the robot to a safe state. In various embodiments, the computed PSD is combined with the POE of the human operator to determine the optimal speed or robot path (or choosing among possible paths) for executing a task. For example, referring to FIG. 12A, the envelopes 1202-1206 represent the largest POEs of the operator at three instants, $t_{1-3}$, respectively, during execution of a human-robot collaborative application; based on the computed PSDs 1208-1212, the robot's locations 1214-1218 that can be closest to the operator at the instants $t_1$-$t_3$, respectively, during performance of the task (while avoiding safety hazards) can be determined. As a result, an optimal path 1220 for the robot movement including the instants $t_1$-$t_3$ can be determined. Alternatively, instead of determining the unconstrained optimal path, the POE and PSD information can be used to select among allowed or predetermined paths given programmed or environmental constraints—i.e., identifying the path alternative that provides greatest efficiency without violating safety constraints.

Figure 12B:
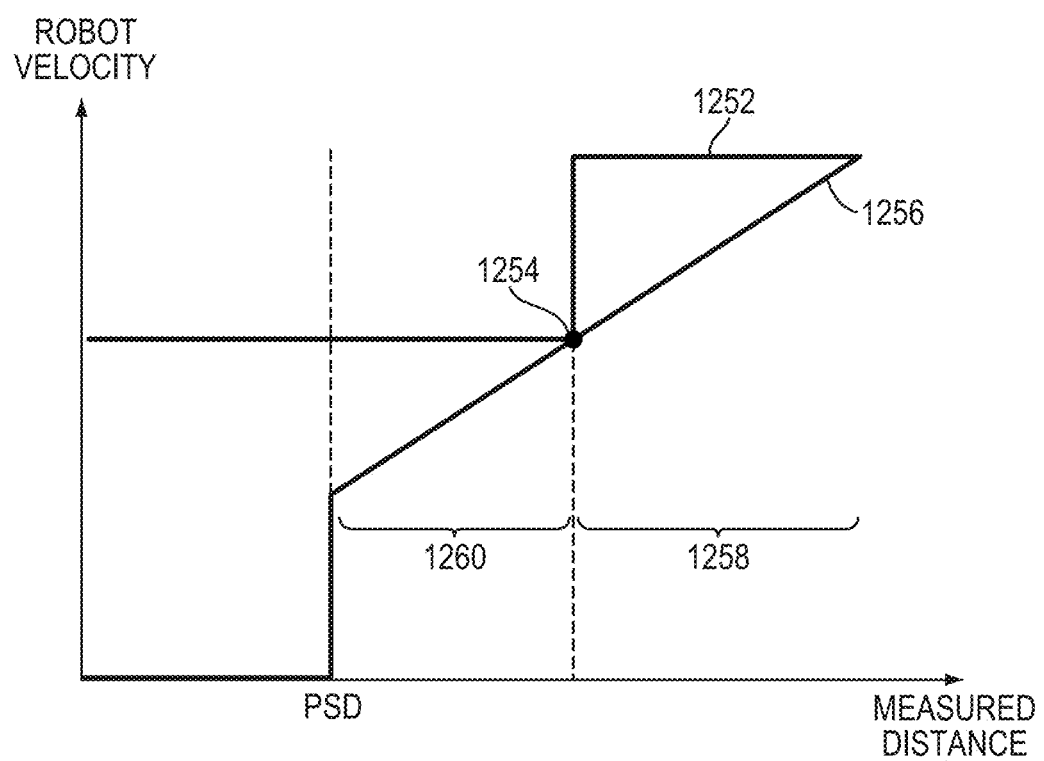
FIG. 12B depicts limiting the velocity of the machinery in a safety-rated way in accordance with various embodiments of the present invention.

In various embodiments, the computed PSD is utilized to govern the speed (or other states) of the machinery; this may be implemented in, for example, an application where the machinery path cannot deviate from its original programmed trajectory. In this case, the PSD between the POEs of the human and the machinery is dynamically computed during performance of the task and continuously compared to the instantaneous measured distance between the human and the machinery (using, e.g., the sensor system 101). However, instead of a system that alters the path of the machinery, or simply initiates a protective stop when the PSD is violated, the control system 112 may govern (e.g., modify) the current speed of the machinery to a lower set point at a distance larger than the PSD. At the instant when the machinery reaches the lower set point, not only will the POE of the machinery be smaller, but the distance that the operator is from the new POE of the machinery will be larger, thereby ensuring safety of the human operator. FIG. 12B depicts this scenario. Line 1252 represents a safety-rated joint monitor, corresponding to a velocity at which an emergency stop is initiated at point 1254. In this example, line 1252 corresponds to the velocity used to compute the size of the machinery's POE. Line 1256 corresponds to the commanded (and actual) speed of the machinery. As the measured distance between the POEs of the machinery and human operator decreases, the commanded speed of the machinery may decrease accordingly, but the size of the machinery's POE does not change (e.g., in region 1258). Once the machinery has slowed down to the particular set point 1254 (at a distance larger than the PSD), the velocity at which the safety-rated joint monitor may trigger an emergency stop can be decreased in a stepwise manner to shrink the POE of the machinery (e.g., in region 1260). The decreased POE of the machinery (corresponding to a decreased PSD) may allow the operator to work in closer proximity to the machinery in a safety-compliant manner. In one embodiment, governing to the lower set point is achieved using a precomputed safety function that is already present in the robot controller or, alternatively, using a safety-rated monitor paired with a non-safety governor.

Further, the spatial mapping described herein (e.g., the POEs of the machinery and human operator and/or the keep-in/keep-out zone) may be combined with enhanced robot control as described in U.S. Pat. No. 10,099,372 ("'372 patent"), the entire disclosure of which is hereby incorporated by reference. The '372 patent considers dynamic environments in which objects and people come, go, and change position; hence, safe actions are calculated by a safe-action determination module (SADM) in real time based on all sensed relevant objects and on the current state of the robot, and these safe actions may be updated each cycle so as to ensure that the robot does not collide with the human operator and/or any stationary object.

Figure 13:
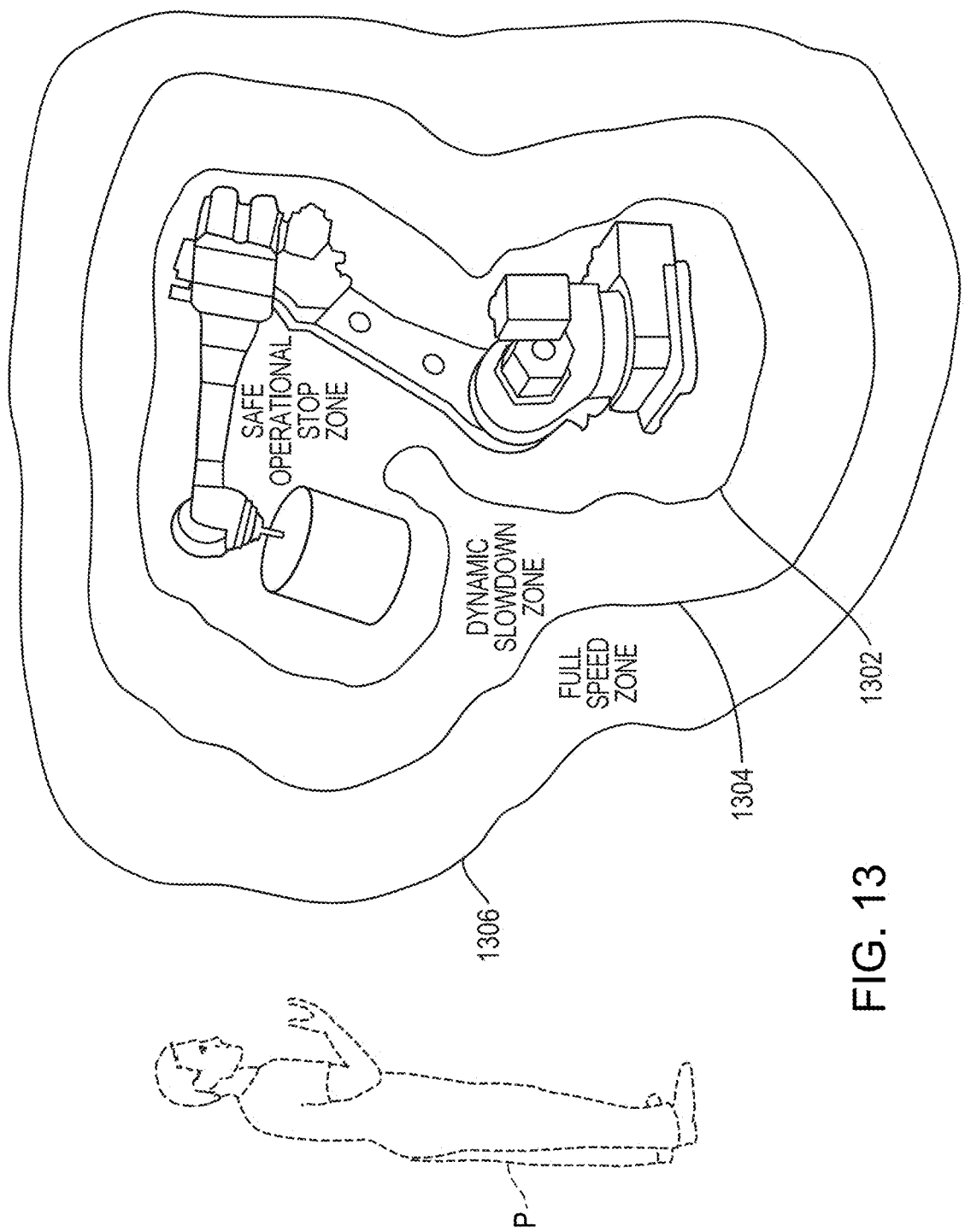
FIG. 13 schematically illustrates the definition of progressive safety envelopes in proximity to the machinery in accordance with various embodiments of the present invention.

One approach to achieving this is to modulate the robot's maximum velocity (by which is meant the velocity of the robot itself or any appendage thereof) proportionally to the minimum distance between any point on the robot and any point in the relevant set of sensed objects to be avoided. For example, the robot may be allowed to operate at maximum speed when the closest object or human is further away than some threshold distance beyond which collisions are not a concern, and the robot is halted altogether if an object/human is within the PSD. For example, referring to FIG. 13, an interior 3D danger zone 1302 around the robot may be computationally generated by the SADM based on the computed PSD or keep-in zone associated with the robot described above; if any portion of the human operator crosses into the danger zone 1302—or is predicted to do so within the next cycle based on the computed POE of the human operator—operation of the robot may be halted. In addition, a second 3D zone 1304 enclosing and slightly larger than the danger zone 1302 may be defined also based on the computed PSD or keep-in zone associated with the robot. If any portion of the human operator crosses the threshold of zone 1304 but is still outside the interior danger zone 1302, the robot is signaled to operate at a slower speed. In one embodiment, the robot is proactively slowed down when the future interval POE of the operator overlaps spatially with the second zone 1304 such that the next future interval POE cannot possibly enter the danger zone 1302. Further, an outer zone 1306 corresponding to a boundary may be defined such that outside this zone 1306, all movements of the human operator are considered safe because, within an operational cycle, they cannot bring the operator sufficiently close to the robot to pose a danger. In one embodiment, detection of any portion of the operator's body within the outer zone 1306 but still outside the second 3D zone 1304 allows the robot 904 to continue operating at full speed. These zones 1302-1306 may be updated if the robot is moved (or moves) within the environment and may complement the POE in terms of overall robot control.

In various embodiments, sufficient margin can be added to each of the zones 1302-1306 to account for movement of relevant objects or humans toward the robot at some maximum realistic velocity. Additionally or alternatively, state estimation techniques based on information detected by the sensor system 101 can be used to project the movements of the human and other objects forward in time. For example, skeletal tracking techniques can be used to identify moving limbs of humans that have been detected and limit potential collisions based on properties of the human body and estimated movements of, e.g., a person's arm rather than the entire person. The robot can then be operated based on the progressive safety zones 1302-1306 and the projected movements of the human and other objects.

Figure 14A:
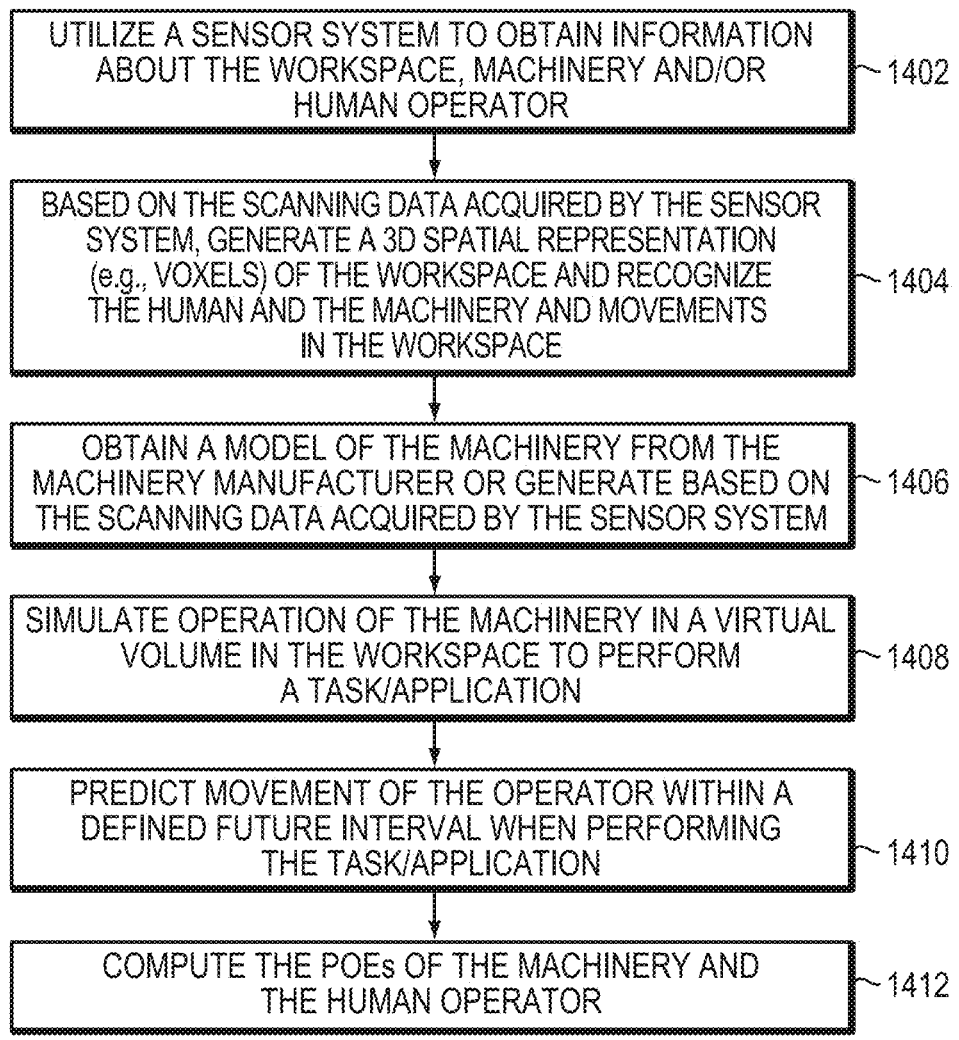
FIGS. 14A and 14B are flow charts illustrating exemplary approaches for computing the POEs of the machinery and human operator in accordance with various embodiments of the present invention.

FIG. 14A illustrates an exemplary approach for computing a POE of the machinery and/or human operator based at least in part on simulation of the machinery's operation in accordance herewith. In a first step 1402, the sensor system is activated to acquire information about the workspace, machinery and/or human operator. In a second step 1404, based on the scanning data acquired by the sensor system, the control system generates a 3D spatial representation (e.g., voxels) of the workspace (e.g., using the analysis module 242) and recognizes the human and the machinery and movements thereof in the workspace (e.g., using the object-recognition module 243). In a third step 1406, the control system accesses the system memory to retrieve a model of the machinery that is acquired from the machinery manufacturer (or the conventional modeling tool) or generated based on the scanning data acquired by the sensor system. In a fourth step 1408, the control system (e.g., the simulation module 244) simulates operation of the machinery in a virtual volume in the workspace for performing a task/application. The simulation module 244 typically receives parameters characterizing the geometry and kinematics of the machinery (e.g., based on the machinery model) and is programmed with the task that the machinery is to perform; that task may also be programmed in the machinery (e.g., robot) controller. In one embodiment, the simulation result is then transmitted to the mapping module 246. (The division of responsibility between the modules 244, 246 is one possible design choice.) In addition, the control system (e.g., the movement-prediction module 245) may predict movement of the operator within a defined future interval when performing the task/application (step 1410). The movement prediction module 245 may utilize the current state of the operator and identification parameters characterizing the geometry and kinematics of the operator to predict all possible spatial regions that may be occupied by any portion of the human operator within the defined interval when performing the task/application. This data may then be passed to the mapping module 246, and once again, the division of responsibility between the modules 245, 246 is one possible design choice. Based on the simulation results and the predicted movement of the operator, the mapping module 246 creates spatial maps (e.g., POEs) of points within a workspace that may potentially be occupied by the machinery and the human operator (step 1412).

Figure 14B:
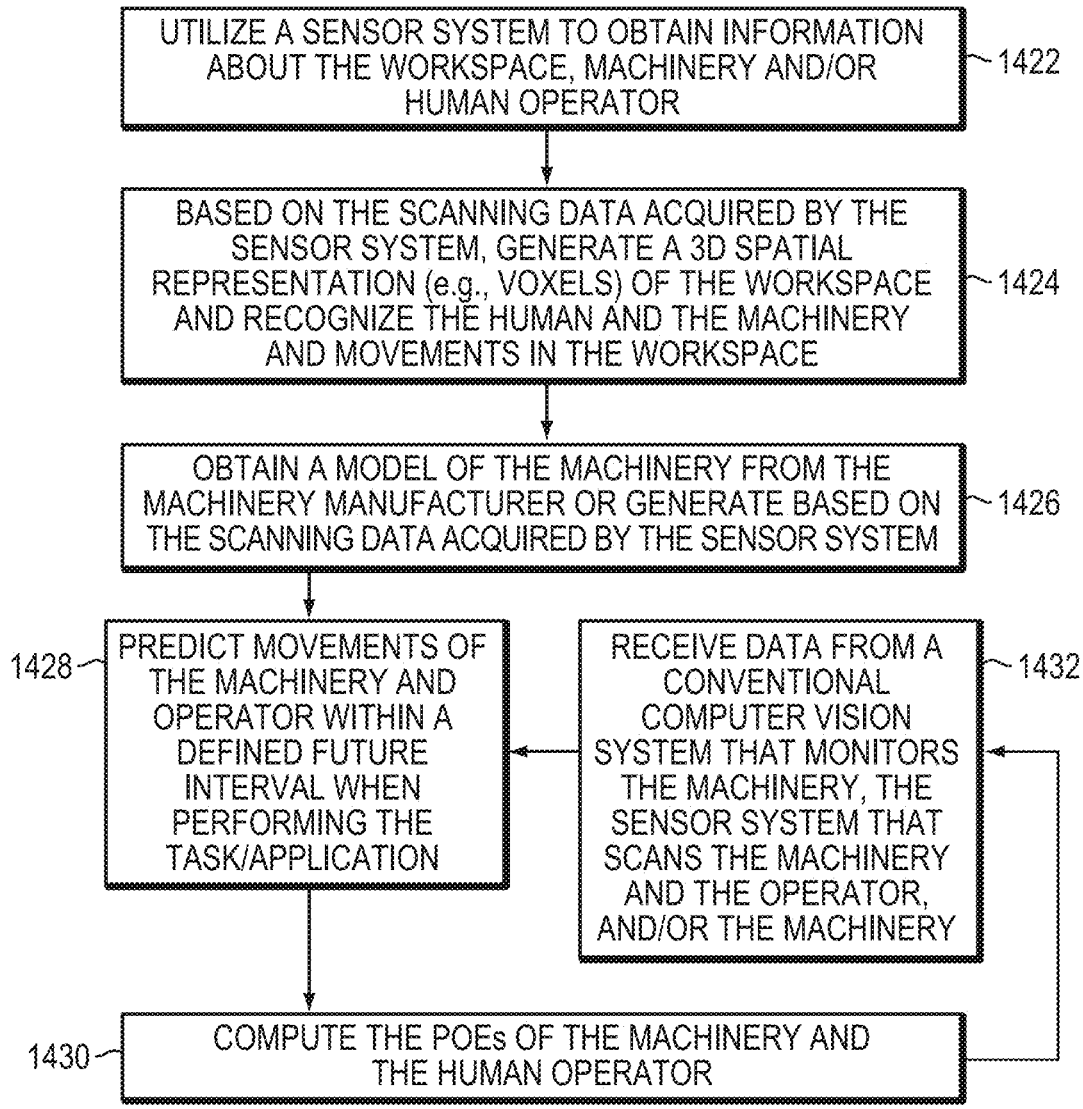

FIG. 14B illustrates an exemplary approach for computing dynamic POEs of the machinery and/or human operator when executing a task/application in accordance herewith. In a first step 1422, the sensor system is activated to acquire information about the workspace, machinery and/or human operator. In a second step 1424, based on the scanning data acquired by the sensor system, the control system generates a 3D spatial representation (e.g., voxels) of the workspace (e.g., using the analysis module 242) and recognizes the human and the machinery and movements thereof in the workspace (e.g., using the object-recognition module 243). In a third step 1426, the control system accesses system memory to retrieve a model of the machinery acquired from the machinery manufacturer (or a conventional modeling tool) or generated based on the scanning data acquired by the sensor system. In a fourth step 1428, the control system (e.g., the movement-prediction module 245) predicts movements of the machinery and/or operator within a defined future interval when performing the task/application. For example, the movement-prediction module 245 may utilize the current states of the machinery and the operator and identification parameters characterizing the geometry and kinematics of the machinery (e.g., based on the machinery model) and the operator to predict all possible spatial regions that may be occupied by any portion of the machinery and any portion of the human operator within the defined interval when performing the task/application. In a fifth step 1430, based on the predicted movements of the machinery and the operator, the mapping module 246 creates the POEs of the machinery and the human operator.

In one embodiment, the mapping module 246 can receive data from a conventional computer vision system that monitors the machinery, the sensor system that scans the machinery and the operator, and/or the robot (e.g., joint position data, keep-in zones and/or or intended trajectory), in step 1432. The computer vision system utilizes the sensor system to track movements of the machinery and the operator during physical execution of the task. The computer vision system is calibrated to the coordinate reference frame of the workspace and transmits to the mapping module 246 coordinate data corresponding to the movements of the machinery and the operator. In various embodiments, the tracking data is then provided to the movement-prediction module 245 for predicting the movements of the machinery and the operator in the next time interval (step 1428). Subsequently, the mapping module 246 transforms this prediction data into voxel-level representations to produce the POEs of the machinery and the operator in the next time interval (step 1430). Steps 1428-1432 may be iteratively performed during execution of the task.

Figure 15:
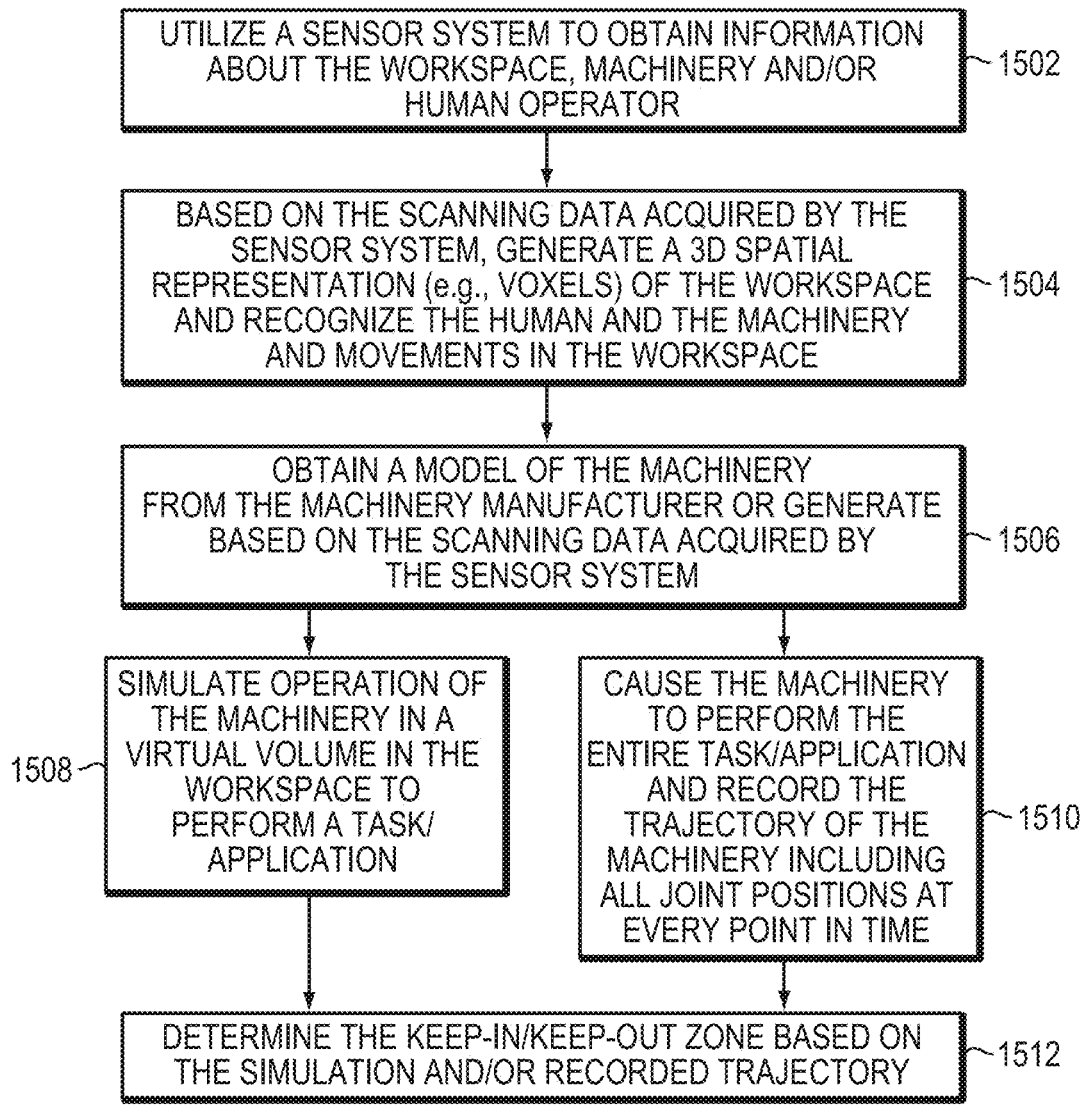
FIG. 15 is a flow chart illustrating an exemplary approach for determining a keep-in zone and/or a keep-out zone in accordance with various embodiments of the present invention.

FIG. 15 illustrates an exemplary approach for determining a keep-in zone and/or a keep-out zone in accordance herewith. In a first step 1502, the sensor system is activated to acquire information about the workspace, machinery and/or human operator. In a second step 1504, based on the scanning data acquired by the sensor system, the control system generates a 3D spatial representation (e.g., voxels) of the workspace (e.g., using the analysis module 242) and recognize the human and the machinery and movements thereof in the workspace (e.g., using the object-recognition module 243). In a third step 1506, the control system accesses system memory to retrieve a model of the machinery acquired from the machinery manufacturer (or the conventional modeling tool) or generated based on the scanning data acquired by the sensor system. In a fourth step 1508, the control system (e.g., the simulation module 244) simulates operation of the machinery in a virtual volume in the workspace in performing a task/application. Additionally or alternatively, the control system may cause the machinery to perform the entire task/application and record the trajectory of the machinery including all joint positions at every point in time (step 1510). Based on the simulation results and/or the recording data, the mapping module 246 determines the keep-in zone and/or keep-out zone associated with the machinery (step 1512). To achieve this, in one embodiment, the mapping module 246 first computes the POEs of the machinery and the human operator based on the simulation results and/or the recording data and then determines the keep-in zone and keep-out zone based on the POEs of the machinery and the POE of the operator, respectively.

Figure 16:
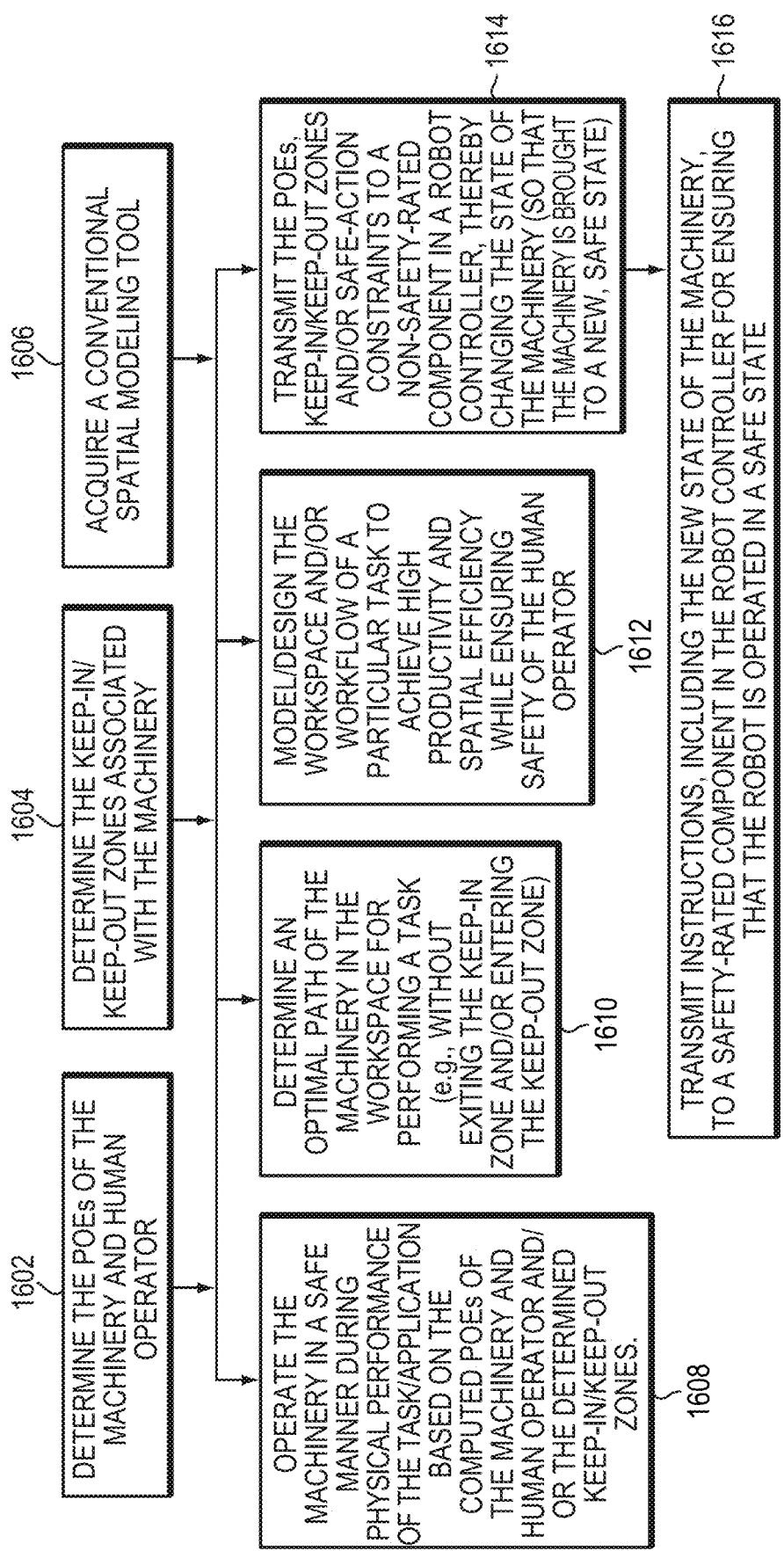
FIG. 16 is a flow chart illustrating an approach for performing various functions in different applications based on the POEs of the machinery and human operator and/or the keep-in/keep-out zones in accordance with various embodiments of the present invention.

FIG. 16 depicts approaches to performing various functions (such as enforcing safe operation of the machinery when performing a task in the workspace, determining an optimal path of the machinery in the workspace for performing the task, and modeling/designing the workspace and/or workflow of the task) in different applications based on the computed POEs of the machinery and human operator and/or the keep-in/keep-out zones in accordance herewith. In a first step 1602, the POEs of the machinery and human operator are determined using the approaches described above (e.g., FIGS. 14A and 14B). Additionally or alternatively, in a step 1604, information about the keep-in/keep-out zones associated with the machinery may be acquired from the robot controller and/or determined using the approaches described above (e.g., FIG. 15). In one embodiment, a conventional spatial modeling tool (e.g., supplied by Delmia Global Operations or Siemens Tecnomatix) is optionally acquired (step 1606). Based on the computed POEs of the machinery and human operator and/or keep-in/keep-out zones, the machinery may be operated in a safe manner during physical performance of the task/application as described above (step 1608). For example, the simulation module 244 may compute a degree of proximity between the POEs of the machinery and human operator (e.g., the PSD), and then the state-determination module 247 may determine the state (e.g., position, orientation, velocity, acceleration, etc.) of the machinery such that the machinery can be operated in a safe state; subsequently, the control system may transmit the determined state to the robot controller to cause and ensure the machinery to be operated in a safe state.

Additionally or alternatively, the control system (e.g., the path-determination module 248) may determine an optimal path to be traversed the machinery to perform the task (e.g., without exiting the keep-in zone and/or entering the keep-out zone) based on the computed POEs of the machinery and human operator and/or keep-in/keep-out zones (e.g., by communicating them to a CAD system) and/or utilizing the conventional spatial modeling tool (step 1610). In some embodiments, the control system (e.g., the workspace-modeling module 249) computationally models the workspace parameter (e.g., the dimensions, workflow, locations of the equipment and/or resources) based on the computed POEs of the machinery and the human operator and/or the keep-in/keep-out zone (e.g., by communicating them to a CAD system) and/or utilizing the conventional spatial modeling tool so as to achieve high productivity and spatial efficiency while ensuring safety of the human operator (step 1612). For example, the workcell can be configured around areas of danger with minimum wasted space. In addition, the POEs and/or keep-in/keep-out zones can be used to coordinate multi-robot tasks, design collaborative applications in which the operator is expected to occupy some portion of the task-level POE in each robot cycle, estimate workcell (or broader facility) production rates, perform statistical analysis of predicted robot location, speed and power usage over time, and monitor the (wear-and-tear) decay of performance in actuation and position sensing through noise characterization. From the workpiece side, the changing volume of a workpiece can be observed as it is processed, for example, in a subtractive application or a palletizer/depalletizer.

Further, in various embodiments, the control system can transmit the POEs and/or keep-in/keep-out zones to a non-safety-rated component in a robot controller via, for example, the robot communication module 1011 and the non-safety-rated channel 1014 for adjusting the state (e.g., speed, position, etc.) of the machinery (step 1614) so that the machinery is brought to a new, safe state. Subsequently, the control system can transmit instructions including, for example, the new state of the machinery to a safety-rated component in the robot controller for ensuring that the machinery is operated in a safe state (step 1616).

Figure 17A:
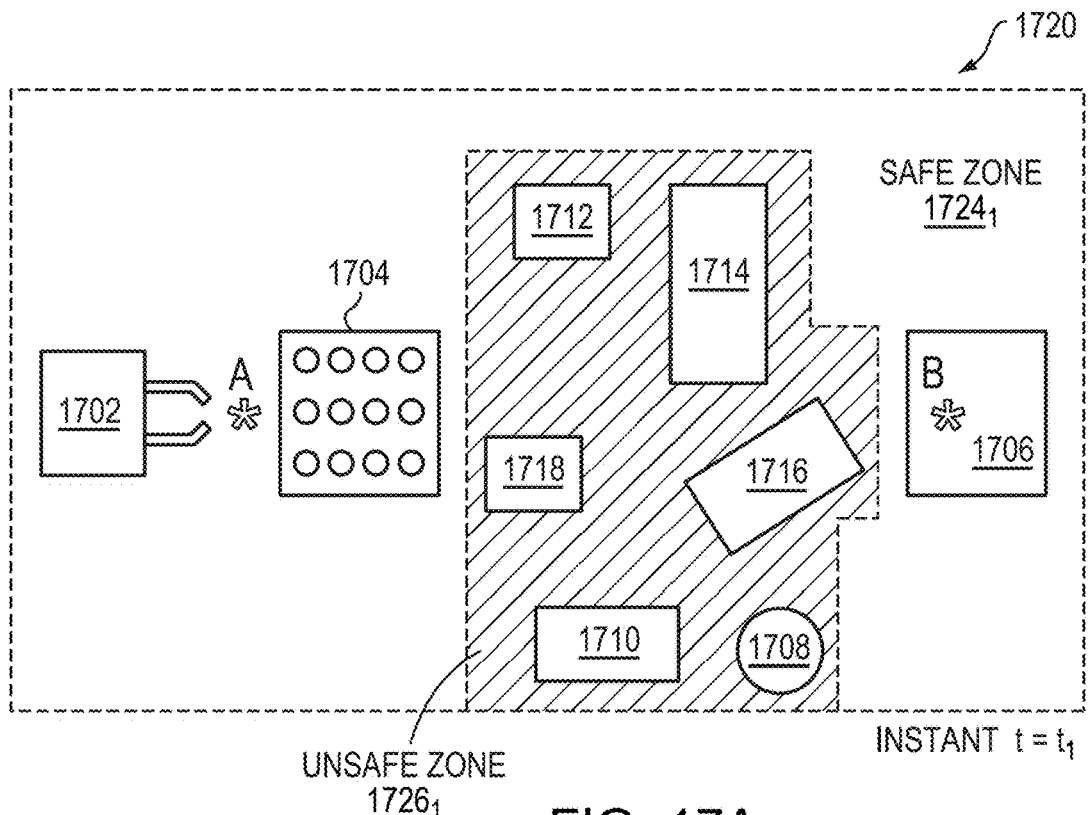
FIGS. 17A-17C schematically illustrate dynamically defined safe zones and unsafe zones in a workspace at three instants of a task in accordance with an embodiment of the invention.
Figure 17B:
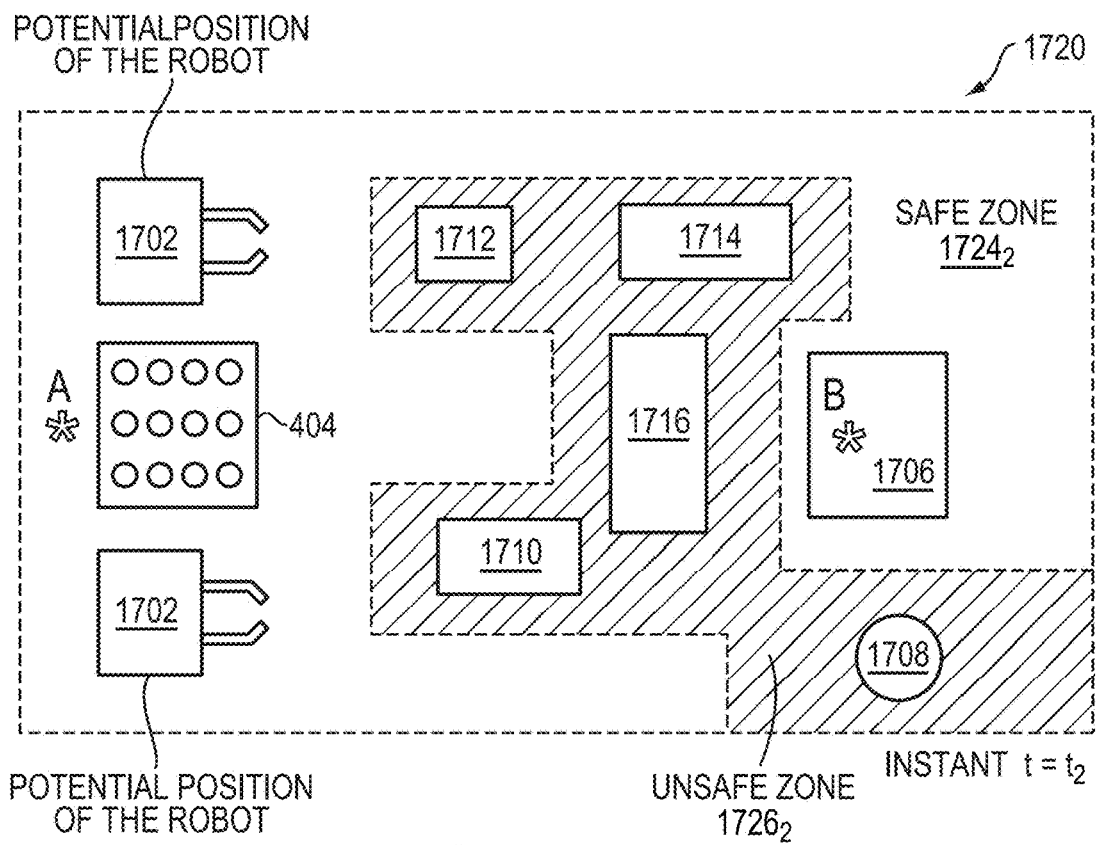
Figure 17C:
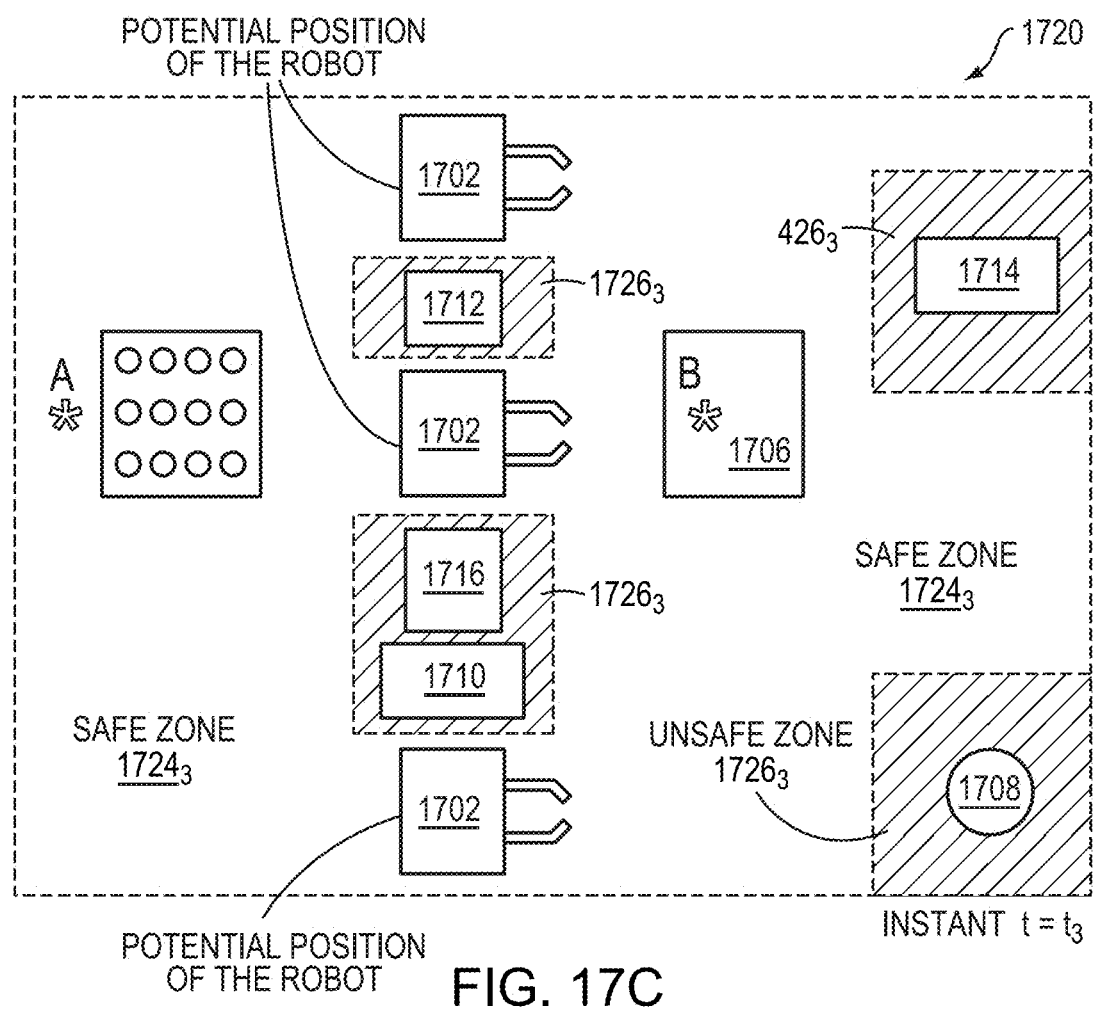
Figure 17D:
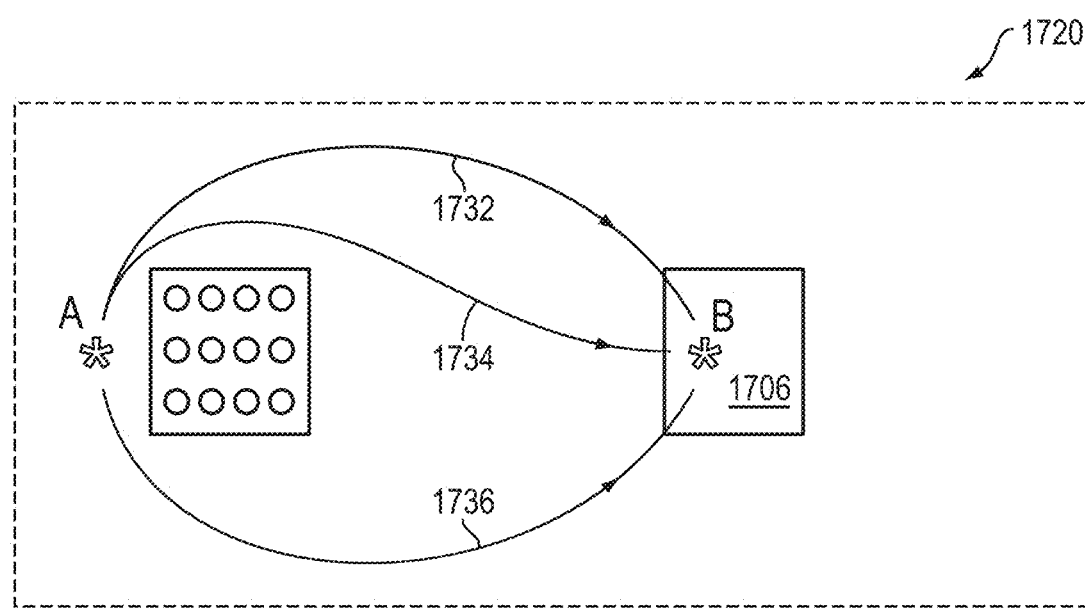
FIG. 17D schematically depicts a constrained motion plan in accordance with an embodiment of the invention.

The path-determination module 248 may generate more than one candidate motion path consistent with the computed POEs of the machinery and human operator and/or keep-in/keep-out zones. For example, with reference to FIGS. 2 and 17A-17C, assuming the robot 1702 is required to move from point A, in front of the parts bin 1704, to point B, at the assembly table 1706, in executing a task, based on the task specification and the identified objects 1708-1716 in the monitored space 1720, the analysis module 242 may classify space in the workspace 1720 into safe zones (e.g., corresponding to unoccupied space) 1724$_{1-3}$ and unsafe zones (e.g., corresponding to occupied and/or unknown space) 1726$_{1-3}$ at three instants, t$_{1-3}$, respectively, during execution of the task. With reference to FIG. 17D, based on the mapped safe and unsafe zones, the path-determination module 248 generates a constrained motion plan for the robot 1702 including three trajectories 1732-1736 and/or one or more states (e.g., orientations, velocities, etc.) of the machinery for performing the task without entering the unsafe zones 1726$_{1-3}$ in any of the instances.

The path-determination module 248 may assign a cost value to each trajectory based on, for example, the path length of the trajectory and/or the time it will take the robot 1702 to traverse it, as well as any other quantifiable benefits or disadvantages to each of the path (e.g., the desirability to keeping some areas of the workspace clear when possible, the proximity each path to entry points that increase the likelihood that a trajectory may become unsafe due to entry of a human, etc.). Based on the assigned cost value, the path-determination module 248 selects the optimal trajectory (e.g., having the minimum cost value), thereby ensuring efficient operation of the machinery. Subsequently, the machinery, e.g., robot 1702, can be operated based on the selected trajectory.

The constrained motion plan typically contains a sequence of selected trajectories that allow the robot 1702 to perform a task. During robot operation, the control routines 252 generate control signals to execute the task based on the selected trajectories. In particular, the control routines 252 generate and deliver an output signal via, for example, the transceiver 225 and/or I/O port 227 to thereby operate the machinery in accordance with the selected trajectory. As explained in greater detail below, the configuration of the safe zones around which the trajectory was planned may change during task execution—for example, a human may intrude into or close to a portion of the trajectory. Therefore, as noted, one element of the attributed cost of a trajectory may be the probability of a change in the safe-zone configuration required for the trajectory—e.g., the relative likelihood among trajectories that a human will appear and alter the safe zone.

Additionally, the path-determination module 248 may be responsive to real-time monitoring of the workspace and alter the motion plan in response to a change in the defined safe zone. For example, the analysis module 242 frequently updates the defined safe zone based on the data acquired by the sensor array. The path-determination module 248 may receive the updated safe zone definition from the analysis module 242 (or, in some embodiments, the space map 245) as it is generated and, based thereon, adjust the motion plan such that the machinery will not enter the updated safe zone. Again, if the updated motion plan includes multiple trajectories of the machinery and the task has not yet been started, the path-determination module 248 may update the cost values assigned thereto and select the optimal trajectory based on the updated cost values so as to ensure efficient operation of the machinery. If the task is in progress, multiple actions are possible. If the robot 1702 is well into the task or if the configuration of the safe zone is changing rapidly, the control routines 252 may simply stop the robot and wait for a short period in case the disruption is momentary. If nothing has changed by the end of this period, the path-determination module 248 may re-execute and attempt to generate viable task-completion trajectories, each having an associated cost as before, that are consistent with the reconfigured safe zone. If the path-determination module 248 succeeds, the least-cost trajectory is selected and executed as discussed above. If not, the robot 1702 may remain in place or, if possible consistent with the new safe zone, return to position and pose at the beginning of task execution. If task execution has just begun, the control routines 350 may immediately reset the robot 1702 to the pre-task position and pose, and determine whether the task can be completed once the new safe zone has been stable for a threshold time period, e.g., a few seconds.

Alternatively, the selected motion path may remain in place, and the control system 112 may simply react to changing conditions to enforce PSD or other safety constraints as described above. In particular, the scanning data of the machinery and the human acquired by the sensor system 101 during performance of the task/application is analyzed on a quasi-continuous basis in real time, and the space map 250 and POEs updated accordingly. With the safe and/or unsafe regions always up to date within the temporal limits required by safe operation and shutdown times, the robot 1702 may follow the selected trajectory and respond to control signals to slow or halt operation as robot and human POEs approach, a keep-out zone is augmented or a keep-in zone diminished.

More generally, as conditions in the workspace change—i.e., people enter and leave or an operator collaborating with the robot changes position—the contours of the POEs may change and the trajectories may change in response to preserve the PSD. In one approach, the analysis module 242 periodically replaces the motion plan, i.e., the path-determination module 248 re-executes and generates viable trajectories—one of which is selected as described above—when one or more of the POEs change sufficiently. In some embodiments, a plurality of feasible task-performance trajectories is computed in advance, and these are reconsidered (and a new selection made) in light of the changed environment. If the pre-computed feasible trajectories constitute all of the practical possibilities (with some fine-tuning of each trajectory possible), and none is capable of accommodating the changed environment, the robot 1702 may be slowed or stopped as described above. The changed environment may reflect not only instantaneous ("snapshot") conditions but also predicted further changes that are included in the POE(s) as described above.

Figure 18A:
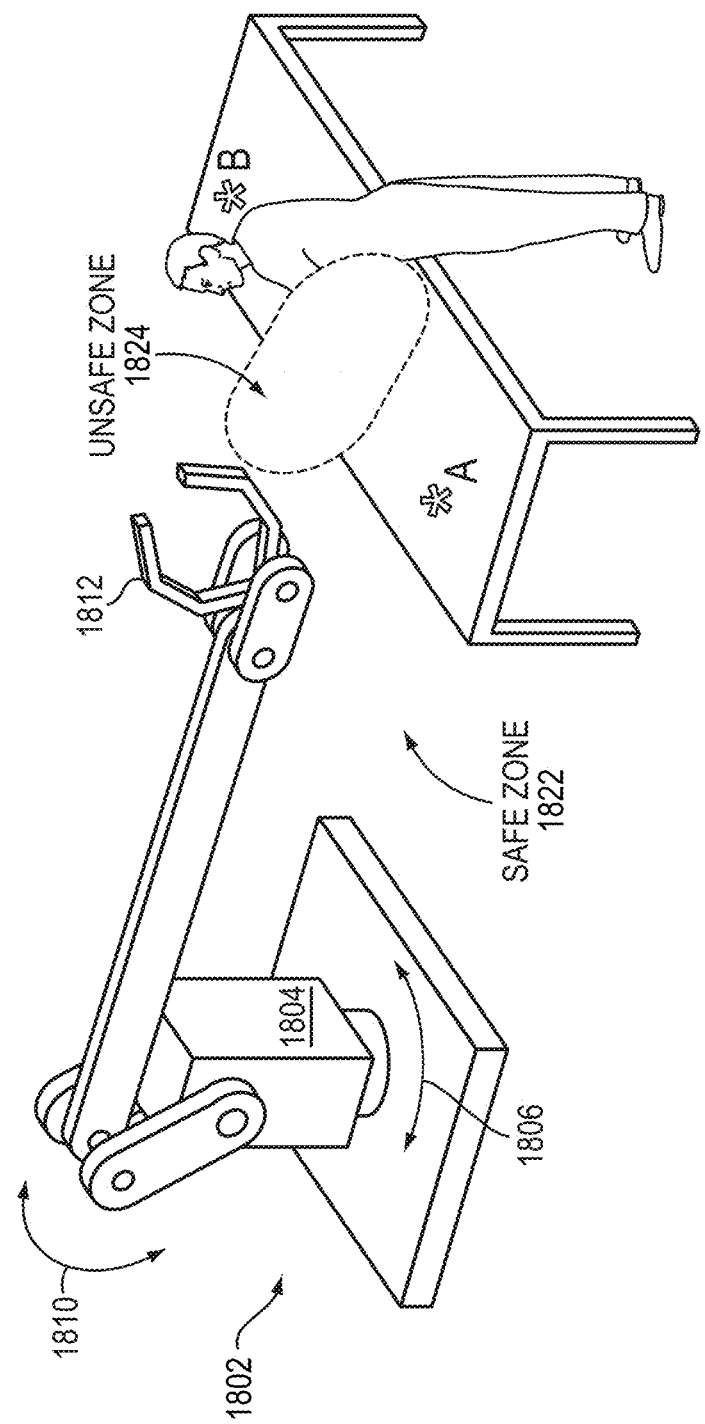
FIG. 18A schematically illustrates dynamically defined safe zones and unsafe zones in a workspace having a six-axis robot in accordance with an embodiment of the invention.
Figure 18B:
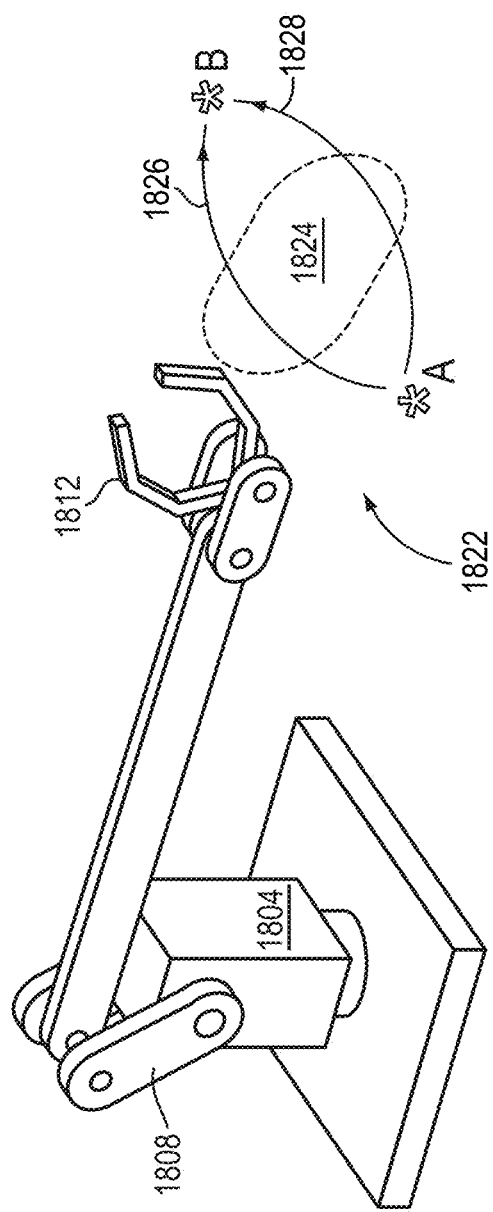
FIG. 18B schematically depicts a constrained motion plan in accordance with an embodiment of the invention.

In another approach, the path-determination module 248 updates rather than replaces the current trajectory. If feasible, this approach may be faster and simpler to implement, but feasibility depends on the degree to which conditions have changed, i.e., whether the current trajectory can be altered to maintain the PSD while still effectively performing the task. For example, rather than sending trajectory waypoints to the robot 1702, the control system 112 send offsets to trajectory waypoints computed by the path-determination module 248, effectively "pushing" the existing trajectory away from a person or danger zone, and 3) use model of world to send robot controller/trajectory planner info about where humans were so it could choose between a set of pre-planned trajectories The approaches described above may be implemented to generate and/or execute a constrained motion plan for many types of machinery, such as a robotic arm. Here the path-determination module 248 may take joint kinematics and physical constraints into account when generating the motion plan. FIG. 18A depicts a six-axis articulated robot 1802; each joint of the robot 1802 has its corresponding constrained kinematics. For example, the base joint 1804 can only turn along its axis perpendicular to the floor (i.e., in the direction 1806); similarly, the joint 1808 physically anchored to the base joint 1804 may only move by rotating around a single axis (in the direction 1810) and have a pose in space constrained by the base joint's rotation; and so on. Assuming the robot's appendage 1812 is required to move an object from point A to point B in executing a task, based on the task specification and an identified operator's arm 1816 in the space monitored by the sensor system 102, the analysis module 242 may classify space in the workspace into safe zones 1822 and unsafe zones 1824 during execution of the task. With reference to FIG. 18B, based on the mapped safe and unsafe zones, the path-determination module 248 generates a constrained motion plan including two trajectories 1826, 1828 for performing the task without entering the unsafe zones 1824 and risking collision with the operator's arm 1816. (Of course, the trajectories 1826, 1828 are exemplary only; the path-determination module 248 may generate any number of trajectories depending on speed requirements, the ability to tolerate delay, and the number of feasible trajectory alternatives.)

To identify the optimal trajectory for the robot 1802, the path-determination module 248 may assign a cost value to each trajectory based on, for example, the path length of the trajectory, the time it will take the robot 1802 to traverse it, allowed or physically possible joint kinematics through the trajectory, as well as any other quantifiable benefits or disadvantages to each of the paths. Again, based on the assigned cost value, the path-determination module 248 selects the optimal trajectory (e.g., having the minimum cost value) and the robot can be operated based on the selected trajectory.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A safety system for enforcing safe operation of machinery performing an activity in a three-dimensional (3D) workspace, the system comprising:
    a computer memory for storing a model of the machinery and its permitted movements and a task specification; and
    a processor configured to:
        computationally generate a 3D spatial representation of the workspace;
        identify a computational representation of a 3D region of the workspace corresponding to (i) space occupied or potentially occupied by a human within the workspace augmented by a 3D envelope around the human corresponding to anticipated movements of the human within the workspace during performance of the specified task and (ii) a protective separation distance;
        update the computational representation at intervals no greater than a worst-case time required to bring the machinery to a safe state or a stopping time of the machinery in a direction toward the 3D envelope around the human;

computationally generate a motion plan comprising a plurality of different trajectories of the machinery to perform the task;

assign a cost value to each of the trajectories based at least in part on relative likelihood among trajectories that human movement within the workspace will alter the 3D region during execution of the trajectory;

select one of the trajectories based at least in part on the cost values assigned to the trajectories; and cause the machinery to execute the selected trajectory and perform the specified task without entering the 3D region and/or violating the protective separation distance.

2. The system of claim 1, wherein the constrained motion plan implements a safety protocol specifying speed restrictions of the machinery in proximity to a human and a minimum separation distance between the machinery and a human.

3. The system of claim 1, wherein the processor is further configured to assign the corresponding cost value to each of the trajectories based at least in part on a length of the trajectory and/or an operation time of the machinery on the trajectory.

4. The system of claim 1, further comprising a plurality of sensors distributed about the workspace, each of the sensors being configured to record images of a portion of the workspace within a sensor field of view, the workspace portions collectively covering the entire workspace, wherein the processor is configured to compute the 3D region of the workspace based on images generated by the sensors during performance of the task by the machinery.

5. The system of claim 4, wherein the processor is responsive to real-time monitoring of the workspace and is further configured to alter the motion plan in response to a change in the 3D region.

6. The system of claim 4, wherein the processor is responsive to real-time monitoring of the workspace and is further configured to recompute the motion plan in response to a change in the 3D region.

7. A method of enforcing safe operation of machinery performing an activity in a three-dimensional (3D) workspace, the method comprising the steps of:

computationally generating a 3D spatial representation of the workspace;

identifying a computational representation of a 3D region of the workspace corresponding to (i) space occupied or potentially occupied by a human within the workspace augmented by a 3D envelope around the human corresponding to anticipated movements of the human within the workspace during performance of the specified task and (ii) a protective separation distance;

updating the computational representation at intervals no greater than a worst-case time required to bring the machinery to a safe state or a stopping time of the machinery in a direction toward the 3D envelope around the human;

computationally generating a motion plan comprising a plurality of different trajectories of the machinery to perform the task;

assigning a cost value to each of the trajectories based at least in part on relative likelihood among trajectories that human movement within the workspace will alter the 3D region during execution of the trajectory;

selecting one of the trajectories based at least in part on the cost values assigned to the trajectories; and causing the machinery to execute the selected trajectory and perform the specified task without entering the 3D region and/or violating the protective separation distance.

8. The method of claim 7, wherein the constrained motion plan implements a safety protocol specifying speed restrictions of the machinery in proximity to a human and a minimum separation distance between the machinery and a human.

9. The method of claim 7, wherein the corresponding cost value is assigned to each of the trajectories based also at least in part on a length of the trajectory and/or an operation time of the machinery on the trajectory.

10. The method of claim 7, further comprising the step of providing a plurality of sensors distributed about the workspace, each of the sensors being configured to record images of a portion of the workspace within a sensor field of view, the workspace portions collectively covering the entire workspace, wherein the 3D region of the workspace is computed based on images generated by the sensors during performance of the task by the machinery.

11. The method of claim 10, and further comprising the step of altering the motion plan in response to a change in the 3D region.

12. The method of claim 10, wherein the motion plan is recomputed in response to a change in the 3D region.

* * * * *